(12) United States Patent
Gao et al.

(10) Patent No.: US 12,342,298 B2
(45) Date of Patent: Jun. 24, 2025

(54) COMMUNICATION METHOD, APPARATUS, AND DEVICE, AND COMPUTER-READABLE STORAGE MEDIUM

(71) Applicant: Huawei Technologies Co., Ltd., Shenzhen (CN)

(72) Inventors: Lei Gao, Beijing (CN); Jiezuo Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 357 days.

(21) Appl. No.: 17/902,604

(22) Filed: Sep. 2, 2022

(65) Prior Publication Data

US 2022/0417879 A1 Dec. 29, 2022

Related U.S. Application Data

(63) Continuation of application No. PCT/CN2020/078237, filed on Mar. 6, 2020.

(51) Int. Cl.
*H04W 56/00* (2009.01)
*H04W 72/044* (2023.01)
(Continued)

(52) U.S. Cl.
CPC ....... *H04W 56/001* (2013.01); *H04W 72/044* (2013.01); *H04W 72/20* (2023.01); *H04W 74/002* (2013.01); *H04W 4/40* (2018.02)

(58) Field of Classification Search
CPC . H04W 56/001; H04W 72/044; H04W 72/20; H04W 74/002; H04W 4/40; H04W 40/22; H04W 4/06; H04W 4/12
See application file for complete search history.

(56) References Cited

U.S. PATENT DOCUMENTS

2015/0264588 A1* 9/2015 Li .................. H04W 56/002
370/350
2018/0376525 A1 12/2018 Feng
(Continued)

FOREIGN PATENT DOCUMENTS

| CN | 107079268 A | 8/2017 |
|----|-------------|--------|
| CN | 107734520 A | 2/2018 |

(Continued)

OTHER PUBLICATIONS

"3rd Generation Partnership Project; Technical Specification Group GSM/EDGE Radio Access Network; Radio transmission and reception (Release 10)," 3GPP TS 45.005 V10.8.0, pp. 1-252, 3rd Generation Partnership Project, Valbonne, France (Nov. 2013).

*Primary Examiner* — Cheikh T Ndiaye
(74) *Attorney, Agent, or Firm* — Leydig, Voit & Mayer, Ltd.

(57) ABSTRACT

Embodiments of this application provide a communication method, a related apparatus, and a related device, which are applied to the communication field, and in particular, to the field of short-range communication, for example, cockpit domain communication. In embodiments of this application, the method includes: receiving first information from a second apparatus, where the first information is used to indicate a first time-frequency resource; and sending second information to at least one third apparatus based on the first information by using a second time-frequency resource, where the second information includes a first synchronization signal and at least one of service data, control information, or system information, and the second time-frequency resource is a subset of the first time-frequency resource.

30 Claims, 13 Drawing Sheets

(51) Int. Cl.
  *H04W 72/20*   (2023.01)
  *H04W 74/00*   (2009.01)
  *H04W 4/40*    (2018.01)

(56) References Cited

U.S. PATENT DOCUMENTS

2020/0037397 A1* 1/2020 Sergeev ................ H04W 76/11
2020/0128528 A1  4/2020 Tang
2021/0045088 A1  2/2021 Cai et al.

FOREIGN PATENT DOCUMENTS

| CN | 110167072 A    | 8/2019  |                |
|----|----------------|---------|----------------|
| CN | 110741700 A    | 1/2020  |                |
| EP | 2938142 B1 *   | 11/2018 | ........... H04L 27/261 |
| EP | 3355628 B1 *   | 7/2023  | ......... H04B 7/18528 |
| WO | 2007076037 A2  | 7/2007  |                |
| WO | WO-2016019529 A1 * | 2/2016 | ............... H04L 7/04 |
| WO | 2016106685 A1  | 7/2016  |                |
| WO | 2019061347 A1  | 4/2019  |                |
| WO | 2019061350 A1  | 4/2019  |                |

* cited by examiner

COMMUNICATION METHOD, APPARATUS, AND DEVICE, AND COMPUTER-READABLE STORAGE MEDIUM

CROSS-REFERENCE TO RELATED APPLICATIONS

This application is a continuation of International Application No. PCT/CN2020/078237, filed on Mar. 6, 2020, the disclosure of which is hereby incorporated by reference in its entirety.

TECHNICAL FIELD

This application relates to the communication field, and in particular, to the field of short-range communication, for example, cockpit domain communication. This application specifically provides a communication method, a communication apparatus, a communication device, and a computer-readable storage medium.

BACKGROUND

Global communication technologies develop rapidly. Compared with fixed communication technologies, wireless communication technologies improve faster and have a wider application. The development of wireless communication technologies is in full swing.

For example, development and application of the Internet of Vehicles attract more attention. Compared with the existing wired communication, in-vehicle wireless communication can help further reduce a quantity, a length, and a weight of in-vehicle cable bundles and corresponding installation, maintenance, and service costs. Therefore, wireless communication technologies are increasingly applied in in-vehicle communication technologies. A quantity and types of in-vehicle communication nodes are increased because of diverse in-vehicle applications. This imposes a higher requirement on an in-vehicle communication capability.

In many wireless communication scenarios, there are usually a plurality of communication domains in a specific communication area or range. The communication domain is a system including a group of communication nodes in communication relationships and the communication connection relationships between the communication nodes. One communication domain includes one primary communication node (which may be referred to as a primary node for short) and at least one secondary communication node (which may be referred to as a secondary node for short), and a communication connection is established between the primary node and the secondary node to implement data exchange. The plurality of communication domains have respective communication links. Therefore, mutual interference of different communication links between the communication domains needs to be resolved.

A vehicle is used as an example. FIG. 1 is a schematic diagram of a topology relationship between communication links inside the vehicle. There are a plurality of communication domains in the vehicle, and there may be a communication domain that sometimes exists and sometimes disappears in the vehicle. In other words, a quantity of communication domains in the vehicle usually dynamically increases or decreases. For example, a communication domain in which a mobile phone is a primary node appears as a person carrying the mobile phone gets on the vehicle, and disappears as the person carrying the mobile phone gets off the vehicle. All communication domains have respective communication links. Therefore, mutual interference of different communication links between the communication domains (in short, between the domains) needs to be resolved for in-vehicle wireless communication. When two wireless communication nodes in the vehicle perform communication by using overlapping time-frequency resources, two corresponding communication links interfere with each other.

In the conventional technology, for example, in a Bluetooth technology, interference randomization is implemented through frequency hopping communication. FIG. 2 is a schematic diagram of frequency hopping communication. A frequency resource used by a communication link changes pseudo-randomly over time. Different communication links change according to different rules. Even if a same resource is used occasionally, next frequency hopping dwell times are staggered. Therefore, continuous interference between two communication links is avoided.

However, the foregoing conventional technology is applicable to only a case of low load, that is, a case in which there is only a small quantity of communication links in adjacent space. In a case of medium or high load, because resources used by a plurality of communication links frequently overlap, obvious interference occurs. As a result, link communication quality significantly deteriorates, and even normal communication cannot be completed.

SUMMARY

Embodiments of this application disclose a communication method, a communication apparatus, a communication device, and a computer-readable storage medium, to resolve technical problems that a probability that resources used by different communication links overlap is high in a case of medium or heavy load, and mutual interference between the communication links is severe.

According to a first aspect, an embodiment of this application provides a communication method. The method includes:

receiving first information from a second apparatus, where the first information is used to indicate a first time-frequency resource; and sending second information to at least one third apparatus based on the first information by using a second time-frequency resource, where the second information includes a first synchronization signal and at least one of service data, control information, or system information, and the second time-frequency resource is a subset of the first time-frequency resource.

In this embodiment of this application, the second apparatus indicates the first time-frequency resource to the first apparatus, so that the first apparatus communicates with a secondary node that is in a communication domain in which the first apparatus is a primary node, for example, a third apparatus, by using the subset of the first time-frequency resource. This step includes sending a first synchronization signal and at least one of service data, control information, or system information to at least one third apparatus by using the second time-frequency resource. The first time-frequency resource indicated by the second apparatus and a time-frequency resource used in a communication domain that the second apparatus is in are non-overlapping. In this way, an inter-domain communication resource coordination mechanism is established. As a result, a resource conflict can be avoided. This method resolves technical problems in the existing technology that a probability that resources used by different communication links overlap is high in a case of medium or heavy load, and mutual interference between the communication links is severe.

In a possible implementation, the method further includes:

receiving service data from at least one third apparatus by using the second time-frequency resource.

In this embodiment of this application, the first apparatus sends the first synchronization signal to at least one third apparatus by using the second time-frequency resource, and sends the system information and/or the control information, and may further receive the service data from at least one third apparatus by using the second time-frequency resource. In this way, mutual interference caused by a communication link in another communication domain is avoided. This method resolves technical problems in the existing technology that a probability that resources used by different communication links overlap is high in a case of medium or heavy load, and mutual interference between the communication links is severe.

In a possible implementation, the first information is carried in at least one of a second synchronization signal, a broadcast message, a unicast message, or a multicast message.

In this embodiment of this application, the first apparatus may learn of, by receiving at least one of the second synchronization signal, the broadcast message, the unicast message, or the multicast message sent by the second apparatus, the first time-frequency resource indicated by the second apparatus, to establish the inter-domain communication resource coordination mechanism in this application.

In a possible implementation, the first information is carried in the second synchronization signal, or carried in the first time-frequency resource corresponding to the second synchronization signal.

In this embodiment of this application, the second synchronization signal corresponds to the first time-frequency resource. For example, relative positions of the first time-frequency resource and a time-frequency resource of the second synchronization signal are in a preset relationship. Alternatively, the information used to indicate the first time-frequency resource is carried in the second synchronization signal sent by the second apparatus. In this case, when detecting the second synchronization signal sent by the second apparatus, the first apparatus may learn of the indicated first time-frequency resource. For example, the relative positions of the first time-frequency resource and the time-frequency resource of the second synchronization signal are in a plurality of possible preset relationships, and the information carried in the second synchronization signal indicates a specific relative position relationship between the first time-frequency resource and the time-frequency resource of the second synchronization signal. A manner of carrying the information in the second synchronization signal includes but is not limited to an identifier number of the second synchronization signal, a circular shift volume of the second synchronization signal, and the like. A coverage area of the synchronization signal is usually greater than that of the system information or the control information, in other words, compared with the system information or the control information, the indicated first time-frequency resource can be learned of by the first apparatus when the first apparatus is far away from the second apparatus. Therefore, resource coordination can be implemented. When a distance between two communication domains is long, mutual interference between communication links in the two communication domains is very small or there is no mutual interference between the communication links in the two communication domains. Therefore, using the second synchronization signal to carry the first information can avoid interference between the communication links in the two communication domains to the greatest extent.

In a possible implementation, the first information is carried in the broadcast message.

In this embodiment of this application, the information used to indicate the first time-frequency resource is carried in the broadcast message of the second apparatus. In this case, the first apparatus can learn of the indicated first time-frequency resource by detecting the broadcast message broadcast by the second apparatus. In this way, the inter-domain communication resource coordination mechanism is established. As a result, a resource conflict can be avoided. This method resolves technical problems in the existing technology that a probability that resources used by different communication links overlap is high in a case of medium or heavy load, and mutual interference between the communication links is severe.

In a possible implementation, the first information is carried in the second synchronization signal and the broadcast message, and the second synchronization signal and the broadcast message jointly indicate the first time-frequency resource.

In this embodiment of this application, information about the first time-frequency resource is jointly indicated by the second synchronization signal and the broadcast message. In this case, when detecting the second synchronization signal and the broadcast message that are sent by the second apparatus, the first apparatus can learn of the indicated first time-frequency resource by parsing the second synchronization signal and the broadcast message. In this way, the inter-domain communication resource coordination mechanism is established. As a result, a resource conflict can be avoided. This method resolves technical problems in the existing technology that a probability that resources used by different communication links overlap is high in a case of medium or heavy load, and mutual interference between the communication links is severe.

In a possible implementation, the first information is carried in at least one of a first multicast message or a first unicast message.

In this embodiment of this application, the information about the first time-frequency resource is indicated by the first multicast message or the first unicast message. In this case, when detecting the first multicast message or the first unicast message sent by the second apparatus, the first apparatus can learn of the indicated first time-frequency resource. Alternatively, the information about the first time-frequency resource is jointly indicated by the first multicast message and the first unicast message. In this case, when detecting the first multicast message and the first unicast message that are sent by the second apparatus, the first apparatus can learn of the indicated first time-frequency resource by parsing the first multicast message and the first unicast message. In this way, the inter-domain communication resource coordination mechanism is established. As a result, a resource conflict can be avoided. This method resolves technical problems in the existing technology that a probability that resources used by different communication links overlap is high in a case of medium or heavy load, and mutual interference between the communication links is severe.

In this embodiment of this application, the second apparatus may send different first unicast messages to a plurality of different first apparatuses, to allocate different first time-frequency resources to different domains (primary nodes corresponding to the domains are different first apparatuses). In this way, resource coordination for the plurality of domains can be implemented, and a resource conflict can be avoided. In a scenario in which there are a plurality of domains, technical problems in the existing technology that a probability that resources used by different communication links overlap is high in a case of medium or heavy load, and mutual interference between the communication links is severe.

In a possible implementation, the method further includes:
  sending resource change information to the at least one third apparatus, where the resource change information is used to indicate information about the second time-frequency resource.

In this embodiment of this application, the resource change information is sent to at least one third apparatus based on the first information, to indicate to use the second time-frequency resource, that is, to implement communication between the first apparatus and at least one third apparatus by using the second time-frequency resource. A manner of indicating to use the second time-frequency resource may be indicating configuration information related to the second time-frequency resource, for example, an uplink-downlink configuration type, or a resource scheduling or mapping type; or indicating information about a time domain resource and/or a frequency domain resource related to the second time-frequency resource, for example, a timing advance, a carrier number, or a frequency offset.

In a possible implementation, the resource change information may be sent to at least one third apparatus before the second information is sent to at least one third apparatus by using the second time-frequency resource.

In a possible implementation, the resource change information may alternatively be sent to at least one third apparatus while the second information is being sent to at least one third apparatus by using the second time-frequency resource, or after the second information is sent to at least one third apparatus by using the second time-frequency resource. A sequence of sending, by the first apparatus, the second information to at least one third apparatus by using the second time-frequency resource and sending the resource change information to the at least one third apparatus is not limited in the communication method in this embodiment of this application.

In a possible implementation, the method further includes:
  sending resource request information to the second apparatus.

In this embodiment of this application, before the first information from the second apparatus is received, the resource request information may be sent to the second apparatus, to request a resource. Subsequently, the first information from the second apparatus is received. In this case, the first information is not a broadcast message or a synchronization signal. The first information may be carried in at least one of a unicast message or a multicast message. The unicast message or the multicast message may indicate a dedicated time-frequency resource that does not overlap with a time-frequency resource of another communication domain. The first apparatus may send the second information to at least one third apparatus by using the indicated time-frequency resource. In a possible implementation of this scenario, before the resource request information is sent to the second apparatus, a connection between the first apparatus and the second apparatus is established.

In another scenario, in this embodiment of this application, after the first information from the second apparatus is received, the resource request information may be sent to the second apparatus, to request a resource. Therefore, a dedicated time-frequency resource that does not overlap with a time-frequency resource of another communication domain may be requested from the second apparatus, and used to send the second information to at least one third apparatus.

In a possible implementation, the resource request information includes:
  at least one of a communication service volume of the first apparatus, a resource requirement of the first apparatus, or channel quality of the first apparatus.

In this embodiment of this application, the second apparatus may allocate a communication resource to the first apparatus based on the communication service volume of the first apparatus, the resource requirement of the first apparatus, or the channel quality of the first apparatus, and manage and reclaim the communication resource. In this way, utilization of communication resources is optimized, and better allocation of the communication resources can be achieved.

In a possible implementation, the method further includes:
  sending resource occupation information of the first apparatus to the second apparatus, where the resource occupation information is used to indicate a third time-frequency resource.

In this embodiment of this application, the first apparatus sends the resource occupation information to the second apparatus, to indicate the third time-frequency resource currently occupied by the first apparatus.

In a possible implementation, the method further includes:
  receiving acknowledgement information for the resource occupation information from the second apparatus, where the third time-frequency resource includes the second time-frequency resource.

In this embodiment of this application, after the first apparatus sends the resource occupation information to the second apparatus to indicate the third time-frequency resource currently occupied by the first apparatus, if the acknowledgement information for the resource occupation information is subsequently received from the second apparatus, it indicates that the second apparatus allows or confirms occupation of the third time-frequency resource by the first apparatus. In this case, the first apparatus may subsequently send the second information to at least one third apparatus by using the second time-frequency resource, or may send the second information to at least one third apparatus by using the third time-frequency resource.

In a possible implementation, the method further includes:
  receiving resource reallocation information from the second apparatus, where the resource reallocation information is used to indicate a fourth time-frequency resource; and
  sending third information to at least one third apparatus based on the resource reallocation information by using a fifth time-frequency resource, where the third information includes a third synchronization signal and at least one of service data, control information, or system information. The third information is information sent by the first apparatus to at least one third apparatus after resource reallocation in this application, and the second information is information sent by the first apparatus to at least one third apparatus before resource reallocation in this application. The third synchronization signal is used for synchronization between the third apparatus and a communication domain in which the first apparatus is a primary node after resource reallocation in this application. The first synchronization signal is used for synchronization between the third apparatus and the communication domain in which the first apparatus is the primary node before resource reallocation in this application. The service data, the control information, or the system information included in the third information is data or information used after resource reallocation in this application; and service data, control information, or system information included in the second information is data or information used before resource reallocation in this application.

The fifth time-frequency resource is a subset of the fourth time-frequency resource.

In this embodiment of this application, after sending the resource occupation information to the second apparatus to indicate the third time-frequency resource currently occupied by the first apparatus, the first apparatus may receive the resource reallocation information from the second apparatus, which indicates that the second apparatus reallocates the fourth time-frequency resource to the first apparatus. This implies that the second apparatus does not allow the first apparatus to occupy the third time-frequency resource. In this case, the first apparatus sends the third information to at least one third apparatus by using the fifth time-frequency resource.

In this embodiment of this application, alternatively, after sending the resource request information to the second apparatus, the first apparatus may receive the resource reallocation information from the second apparatus, which indicates that the second apparatus reallocates the fourth time-frequency resource to the first apparatus. This implies that the second apparatus does not allow the first apparatus to occupy the third time-frequency resource. In this case, the first apparatus sends the third information to at least one third apparatus by using the fifth time-frequency resource.

In a possible implementation, the first time-frequency resource is discontinuous in time domain.

When the first apparatus and the second apparatus serve as primary nodes simultaneously, if receiving and sending times of the first apparatus and the second apparatus are the same, the first apparatus cannot receive a signal and information transmitted by the second apparatus, and cannot complete operations such as synchronizing with the second apparatus, receiving system information, transmitting a resource request, and obtaining information about resource scheduling performed by the second apparatus for a communication domain that the first apparatus is in. In this embodiment of this application, it is specified that the first time-frequency resource is discontinuous in time domain, so that the foregoing technical problems can be resolved. The first apparatus may complete, at a time other than a time domain resource to which the first time-frequency resource belongs, the operations such as synchronizing with the second apparatus, receiving system information, transmitting a resource request, and obtaining information about resource scheduling performed by the second apparatus for the communication domain that the first apparatus is in. In other words, interaction between the first apparatus and the second apparatus and interaction between the first apparatus and another apparatus in the communication domain that the first apparatus is in, for example, the third apparatus, are implemented at different times.

In a possible implementation, the fourth time-frequency resource is discontinuous in time domain.

According to a second aspect, an embodiment of this application discloses a communication method. The communication method includes:
  sending first information, where the first information is used to indicate a first time-frequency resource; and
  communicating with at least one fourth apparatus by using a target time-frequency resource, where the target time-frequency resource and the first time-frequency resource are non-overlapping.

The first time-frequency resource includes a second time-frequency resource, the second time-frequency resource is used to carry second information transmitted between a first apparatus and at least one third apparatus, and the second information includes a first synchronization signal and at least one of service data, control information, or system information.

Optionally, before the sending first information, the method further includes: determining the first time-frequency resource. For example, the second apparatus determines the first time-frequency resource according to a communication protocol, or the second apparatus determines the first time-frequency resource according to a principle of allocating different time-frequency resources to different target communication domains.

In this embodiment of this application, the second apparatus indicates the first time-frequency resource to the first apparatus, so that the first apparatus communicates with a secondary node in a communication domain in which the first apparatus is a primary node (for example, a third apparatus) by using a subset of the first time-frequency resource. This step includes sending a first synchronization signal and at least one of service data, control information, or system information to at least one third apparatus by using the subset of the first time-frequency resource. The first time-frequency resource indicated by the second apparatus and a time-frequency resource used in a communication domain that the second apparatus is in are non-overlapping. In this way, an inter-domain communication resource coordination mechanism is established. As a result, a resource conflict can be avoided. This method resolves technical problems in the existing technology that a probability that resources used by different communication links overlap is high in a case of medium or heavy load, and mutual interference between the communication links is severe.

In a possible implementation, the first information is carried in at least one of a second synchronization signal, a broadcast message, a unicast message, or a multicast message.

In a possible implementation, the method further includes:
  receiving resource request information; and
  sending resource reallocation information based on the resource request information, where the resource reallocation information is used to indicate a fourth time-frequency resource.

In this embodiment of this application, the first apparatus sends the resource request information, and the second apparatus sends the resource reallocation information based on the resource request information, to reallocate the fourth time-frequency resource to a first communication domain as a communication resource. This can prevent a resource conflict caused when a plurality of communication domains simultaneously use the first time-frequency resource for intra-domain communication for a long time and select a same second time-frequency resource or overlapping second time-frequency resources.

In a possible implementation, the method further includes:
receiving resource occupation information, where the resource occupation information is used to indicate a third time-frequency resource; and
sending the resource reallocation information based on the resource occupation information, where the resource reallocation information is used to indicate the fourth time-frequency resource.

In this embodiment of this application, the first apparatus may send the resource occupation information to the second apparatus to indicate the third time-frequency resource currently occupied by the first apparatus. After receiving the resource occupation information, the second apparatus may send the resource reallocation information based on the resource occupation information, which indicates that the second apparatus reallocates the fourth time-frequency resource to the first apparatus. This implies that the second apparatus does not allow the first apparatus to occupy the third time-frequency resource. In this case, the first apparatus sends third information to at least one third apparatus by using a fifth time-frequency resource.

In a possible implementation, the resource request information includes:
at least one of a communication service volume of the first apparatus, a resource requirement of the first apparatus, or channel quality of the first apparatus.

In this embodiment of this application, the second apparatus may allocate a communication resource to the first apparatus based on the communication service volume of the first apparatus, the resource requirement of the first apparatus, or the channel quality of the first apparatus, and manage and reclaim the communication resource. In this way, utilization of communication resources is optimized, and better allocation of the communication resources can be achieved.

In a possible implementation, the method further includes:
receiving the resource occupation information, where the resource occupation information is used to indicate the third time-frequency resource; and
sending acknowledgement information for the resource occupation information, where the third time-frequency resource includes the second time-frequency resource.

In this embodiment of this application, the first apparatus sends the resource occupation information to the second apparatus to indicate the third time-frequency resource currently occupied by the first apparatus. The second apparatus sends the acknowledgement information for the resource occupation information after receiving the resource occupation information, which indicates that the second apparatus allows or confirms occupation of the third time-frequency resource by the first apparatus. In this case, the first apparatus may subsequently send the second information to at least one third apparatus by using the second time-frequency resource, or may send the second information to at least one third apparatus by using the third time-frequency resource.

In a possible implementation, the first time-frequency resource is discontinuous in time domain.

When the first apparatus and the second apparatus serve as primary nodes simultaneously, if receiving and sending times of the first apparatus and the second apparatus are the same, the first apparatus cannot receive a signal and information transmitted by the second apparatus, and cannot complete operations such as synchronizing with the second apparatus, receiving system information, transmitting a resource request, and obtaining information about resource scheduling performed by the second apparatus for a communication domain that the first apparatus is in. In this embodiment of this application, it is specified that the first time-frequency resource is discontinuous in time domain, so that the foregoing technical problems can be resolved. The first apparatus may complete, at a time other than a time domain resource to which the first time-frequency resource belongs, the operations such as synchronizing with the second apparatus, receiving system information, transmitting a resource request, and obtaining information about resource scheduling performed by the second apparatus for the communication domain that the first apparatus is in. In other words, interaction between the first apparatus and the second apparatus and interaction between the first apparatus and another apparatus in the communication domain that the first apparatus is in, for example, the third apparatus, are implemented at different times.

In a possible implementation, the fourth time-frequency resource may also be discontinuous in time domain.

According to a third aspect, an embodiment of this application discloses a communication apparatus. The communication apparatus includes:
a first receiving unit, configured to receive first information from a second apparatus, where the first information is used to indicate a first time-frequency resource; and
a first sending unit, configured to send second information to at least one third apparatus based on the first information by using a second time-frequency resource, where the second information includes a first synchronization signal and at least one of service data, control information, or system information, and the second time-frequency resource is a subset of the first time-frequency resource.

In a possible implementation, the first receiving unit is further configured to receive service data from at least one third apparatus by using the second time-frequency resource.

In a possible implementation, the first information is carried in at least one of a second synchronization signal, a broadcast message, a unicast message, or a multicast message.

In a possible implementation, the first information is carried in the second synchronization signal, or carried in the first time-frequency resource corresponding to the second synchronization signal.

In a possible implementation, the first information is carried in the broadcast message.

In a possible implementation, the first information is carried in the second synchronization signal and the broadcast message, and the second synchronization signal and the broadcast message jointly indicate the first time-frequency resource.

In a possible implementation, the first information is carried in at least one of a first multicast message or a first unicast message.

In a possible implementation, the first sending unit is further configured to send resource change information to the at least one third apparatus, where the resource change information is used to indicate information about the second time-frequency resource.

In a possible implementation, the first sending unit is further configured to send resource request information to the second apparatus.

In a possible implementation, the resource request information includes:

at least one of a communication service volume of a first apparatus, a resource requirement of the first apparatus, or channel quality of the first apparatus.

In a possible implementation, the first sending unit is further configured to send resource occupation information of the first apparatus to the second apparatus, where the resource occupation information is used to indicate a third time-frequency resource.

In a possible implementation, the first receiving unit is further configured to receive acknowledgement information for the resource occupation information from the second apparatus, where the third time-frequency resource includes the second time-frequency resource.

In a possible implementation, the first receiving unit is further configured to receive resource reallocation information from the second apparatus, where the resource reallocation information is used to indicate a fourth time-frequency resource; and the first sending unit is further configured to send third information to at least one third apparatus based on the resource reallocation information by using a fifth time-frequency resource, where the fifth time-frequency resource is a subset of the fourth time-frequency resource.

In a possible implementation, the first time-frequency resource is discontinuous in time domain.

In a possible implementation, the fourth time-frequency resource is discontinuous in time domain.

It may be understood that for beneficial effects of the third aspect described above, reference may be made to beneficial effects of the communication method provided in the first aspect. Details are not described herein again.

According to a fourth aspect, an embodiment of this application discloses a communication apparatus. The communication apparatus includes:

a second sending unit, configured to send first information, where the first information is used to indicate a first time-frequency resource; and a communication unit, configured to communicate with at least one fourth apparatus by using a target time-frequency resource, where the target time-frequency resource and the first time-frequency resource are non-overlapping.

The first time-frequency resource includes a second time-frequency resource, the second time-frequency resource is used to carry second information transmitted between a first apparatus and at least one third apparatus, and the second information includes a first synchronization signal and at least one of service data, control information, or system information.

In a possible implementation, the first information is carried in at least one of a second synchronization signal, a broadcast message, a unicast message, or a multicast message.

In a possible implementation, the communication apparatus further includes:

a second receiving unit, configured to receive resource request information; and the second sending unit is further configured to send resource reallocation information based on the resource request information, where the resource reallocation information is used to indicate a fourth time-frequency resource.

In a possible implementation, the second receiving unit is further configured to receive resource occupation information, where the resource occupation information is used to indicate a third time-frequency resource; and the second sending unit is further configured to send the resource reallocation information based on the resource occupation information, where the resource reallocation information is used to indicate the fourth time-frequency resource.

In a possible implementation, the resource request information includes:

at least one of a communication service volume of the first apparatus, a resource requirement of the first apparatus, or channel quality of the first apparatus.

In a possible implementation, the second receiving unit is further configured to receive the resource occupation information, where the resource occupation information is used to indicate the third time-frequency resource; and the second sending unit is further configured to send acknowledgement information for the resource occupation information, where the third time-frequency resource includes the second time-frequency resource.

In a possible implementation, the first time-frequency resource is discontinuous in time domain.

In a possible implementation, the fourth time-frequency resource may also be discontinuous in time domain.

It may be understood that for beneficial effects of the fourth aspect described above, reference may be made to beneficial effects of the communication method provided in the second aspect. Details are not described herein again.

According to a fifth aspect, an embodiment of this application discloses an electronic device. The electronic device includes at least one processor, and the processor is configured to support the electronic device in implementing a corresponding function in the communication method according to the first aspect or the second aspect. The electronic device may further include a memory. The memory is coupled to the processor, and the memory stores program instructions and data that are necessary for the electronic device. The electronic device may further include a communication interface that is used for communication between the electronic device and another device or a communication network.

According to a sixth aspect, an embodiment of this application discloses a computer-readable storage medium, including computer instructions. When the computer instructions are run on an electronic device, the electronic device is enabled to perform the communication method according to any implementation of the first aspect or the second aspect of embodiments of this application.

According to a seventh aspect, an embodiment of this application discloses a computer program product. When the computer program product runs on an electronic device, the electronic device is enabled to perform the communication method according to any implementation of the first aspect or the second aspect of embodiments of this application.

According to an eighth aspect, an embodiment of this application discloses a chip. The chip includes a processor, configured to support a network device in implementing the function in the first aspect or the second aspect, for example, generating or processing information in the foregoing communication method. In a possible design, the chip further includes a memory, and the memory is configured to store program instructions and data that are necessary for a data sending device. A chip system may include a chip, or may include a chip and another discrete component.

It may be understood that for beneficial effects of the fifth aspect, the sixth aspect, the seventh aspect, and the eighth aspect described above, reference may be made to beneficial effects of the communication method provided in the first aspect or the second aspect. Details are not described herein again.

DESCRIPTION OF EMBODIMENTS

Figure 1:
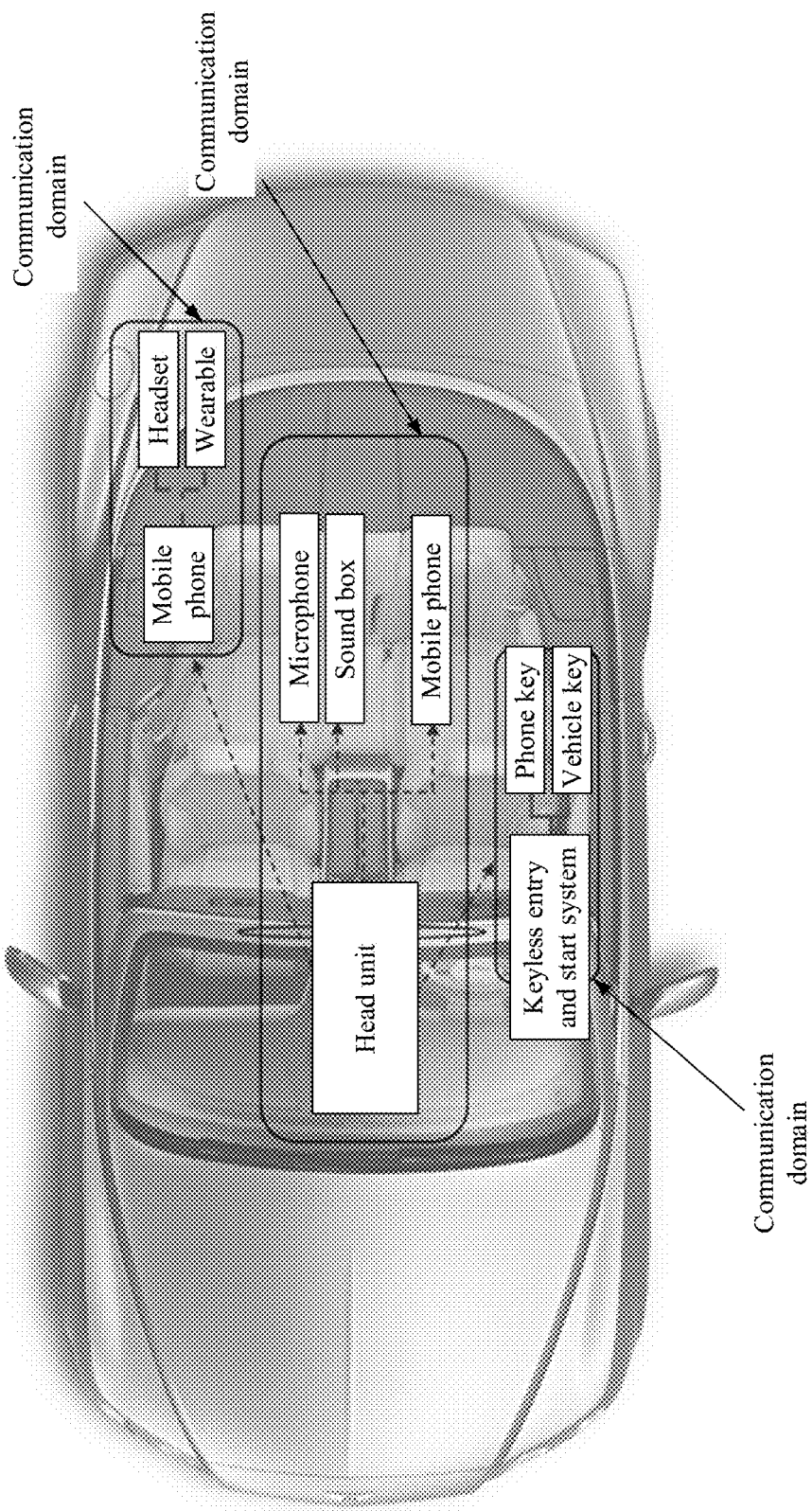
FIG. 1 is a schematic diagram of a topology relationship of communication links inside a vehicle according to an embodiment of this application.
Figure 2:
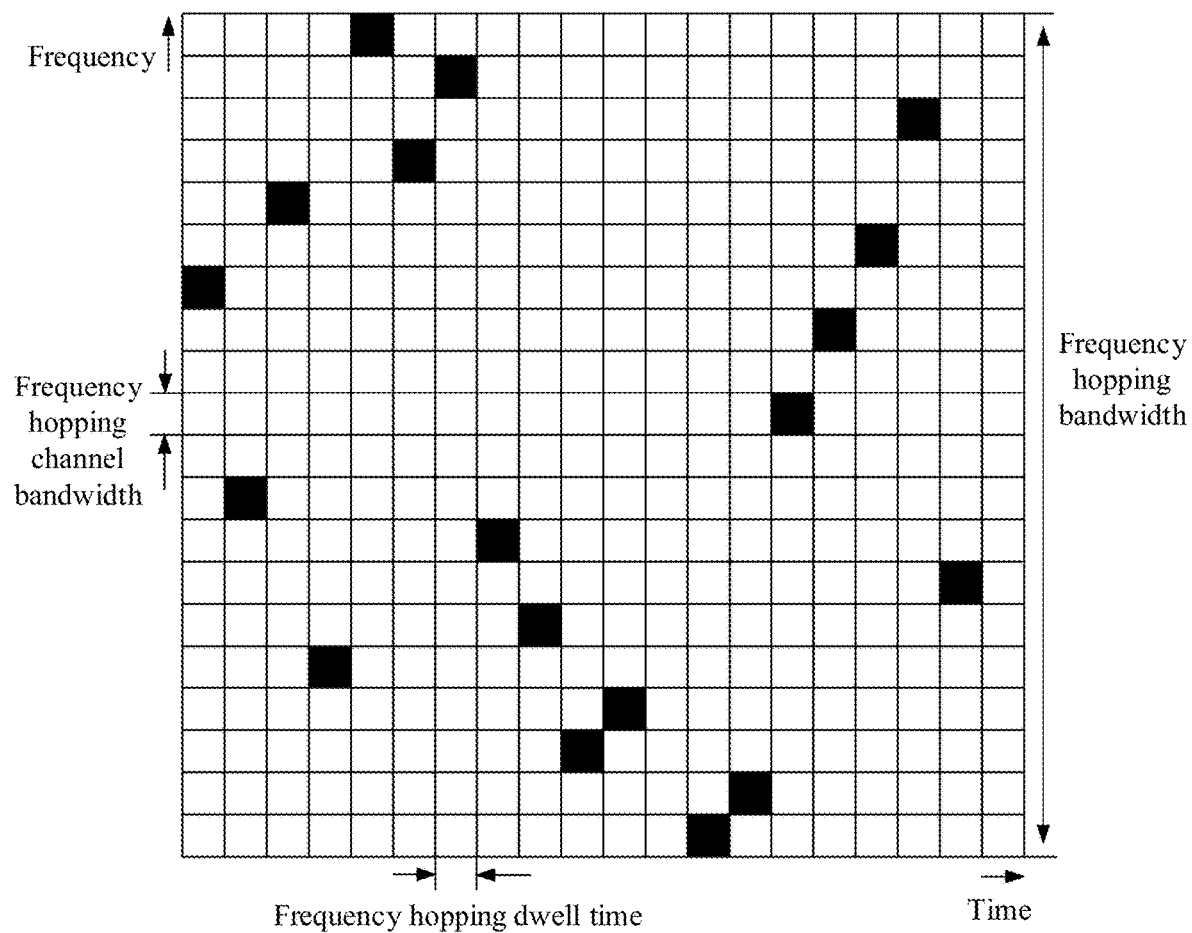
FIG. 2 is a schematic diagram of frequency hopping communication according to an embodiment of this application.

The following describes embodiments of this application with reference to accompanying drawings in embodiments of this application.

In the specification, claims, and the accompanying drawings of this application, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to listed steps or units, but optionally further includes an unlisted step or unit, or optionally further includes another inherent step or unit of the process, the method, the product, or the device.

"Embodiment" mentioned in this specification means that a particular feature, structure, or characteristic described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that an embodiment described in the specification may be combined with another embodiment.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as an Internet interacting with other systems by using the signal).

An apparatus in embodiments of this application may be an in-vehicle device such as a head unit, an in-vehicle speaker, or an in-vehicle microphone, or may be an electronic device such as a mobile phone, a tablet computer, a desktop computer, a laptop, a notebook computer, an ultra-mobile personal computer (UMPC), a handheld computer, a netbook, a personal digital assistant (PDA), a wearable electronic device, or a virtual reality device.

Some terms in this application are first described, to help a person skilled in the art has a better understanding.

(1) CDC: Cockpit Domain Controller or Control Domain Cockpit is referred to as a head unit. Currently, in addition to conventional functions such as playing radio programs, playing music and videos, and navigation, the head unit has a cellular communication function (3G, 4G, and the like) and applies Telematics. By using a CAN-BUS technology, the head unit can implement human-vehicle information communication and vehicle-to-everything information communication. This improves user experience and services, and enhances security functions.

(2) Primary node and secondary node: Based on logical functions, nodes are classified into two types: primary node and secondary node. The primary node manages the secondary node and has a resource allocation function. The primary node allocates a resource to the secondary node. The secondary node is subject to scheduling of the primary node and uses the resource allocated by the primary node to communicate with the primary node. The nodes may be various apparatuses. For example, the primary node is a mobile phone, and the secondary node is a headset. A communication connection is established between the mobile phone and the headset to implement data exchange.

The mobile phone manages the headset. The mobile phone has a resource allocation function and can allocate a resource to the headset.

(3) Communication domain: A communication domain is a system formed by a group of communication nodes in communication relationships and the communication connection relationships between the communication nodes. One apparatus or device may be in a plurality of communication domains. For example, when a mobile phone performs wireless communication with a headset, the mobile phone is in a communication domain a that includes the mobile phone and the headset, where the mobile phone is a primary node, and the headset is a secondary node in the communication domain a. After the mobile phone detects a CDC and establishes a wireless connection with the CDC, the mobile phone is also in a communication domain b that includes the mobile phone and the CDC, where the CDC is a primary node in the communication domain b, the mobile phone is a secondary node, and the mobile phone is subject to scheduling of the CDC. The communication domain b may further include another secondary node, for example, an in-vehicle sound box or a microphone.

A wireless communication scenario to which a communication method provided in embodiments of this application is applied may include wide area wireless communication, for example, communication between a plurality of base stations and a plurality of user equipments (UEs). An in-vehicle wireless communication scenario may also be included, for example, communication between a CDC and an in-vehicle sound box, an in-vehicle microphone, or a mobile phone, and communication between a mobile phone and a wearable device such as a headset. Local wireless communication may be further included, for example, communication between a plurality of access points (APs) and a plurality of stations may be included.

To facilitate understanding of the communication method in embodiment of this application, an in-vehicle wireless communication scenario is used as an example for the following description. However, the communication method in embodiments of this application is not limited to the in-vehicle communication scenario.

Figure 3:
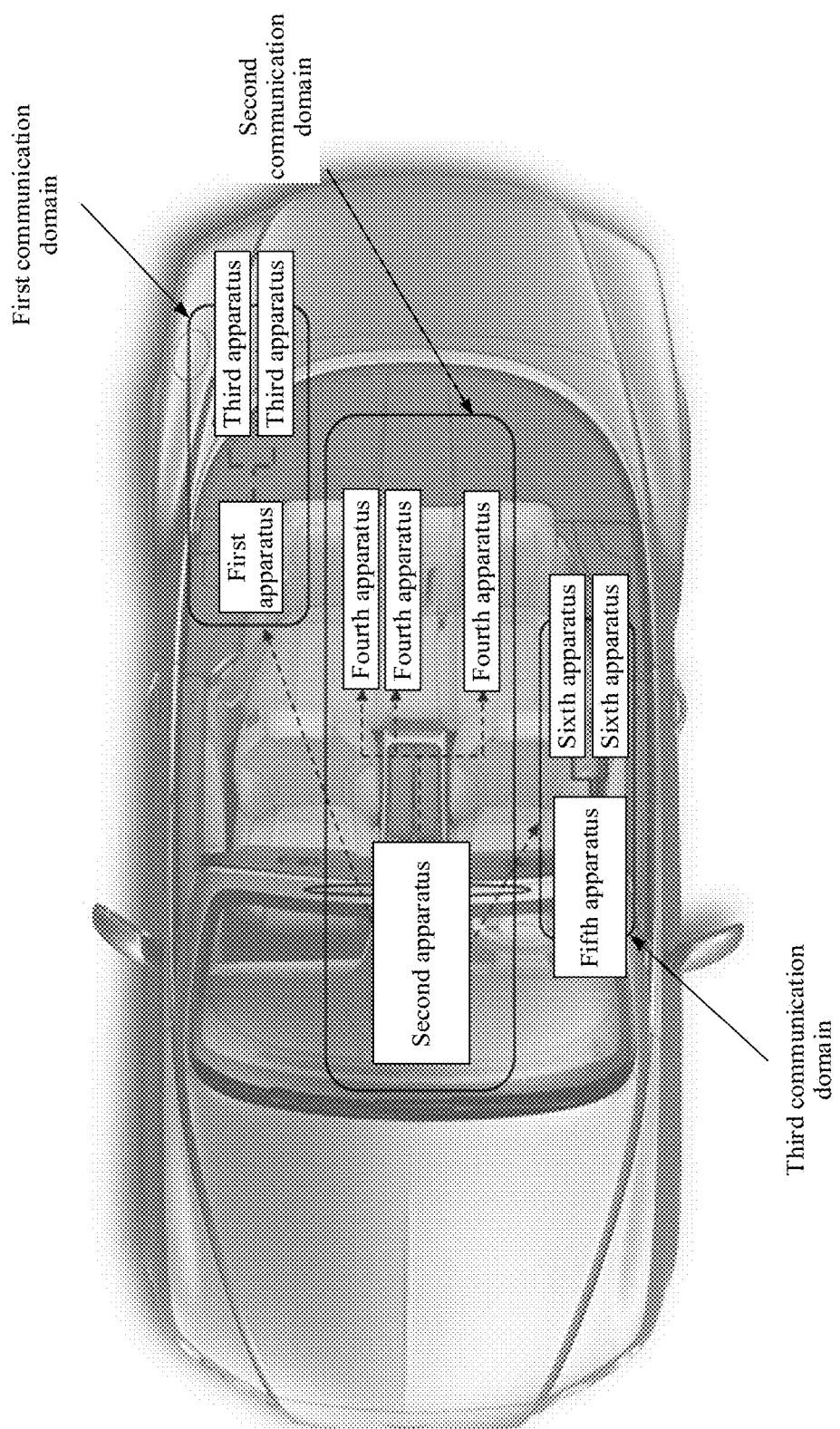
FIG. 3 is a schematic diagram of a scenario-based structure to which a communication method according to an embodiment of this application is applied.

FIG. 3 is a schematic diagram of a scenario architecture of a communication method according to an embodiment of this application. The scenario-based architecture may include but is not limited to including a first apparatus, a second apparatus, a third apparatus, and a fourth apparatus. The first apparatus may be a mobile phone. The second apparatus may be a CDC. The third apparatus may include a plurality of wearable devices such as a headset and a wristband. The fourth apparatus may also include a plurality of devices such as an in-vehicle sound box and an in-vehicle microphone. It can be learned from the above description that the first apparatus and the second apparatus are different. In some possible scenarios, the first apparatus and the second apparatus may be of a same type, for example, both are CDCs, but the first apparatus and the second apparatus represent different CDCs.

The second apparatus may be a device that performs control and management such as allocation and coordination of communication resources in an in-vehicle wireless communication scenario. The second apparatus establishes a communication connection with at least one fourth apparatus to form a second communication domain. The first apparatus establishes a communication connection with at least one third apparatus to form a first communication domain.

In a possible implementation, the scenario-based architecture in this embodiment of this application may further include a communication domain formed by more apparatuses, for example, a fifth apparatus and a sixth apparatus. This is not limited in this application.

Figure 4:
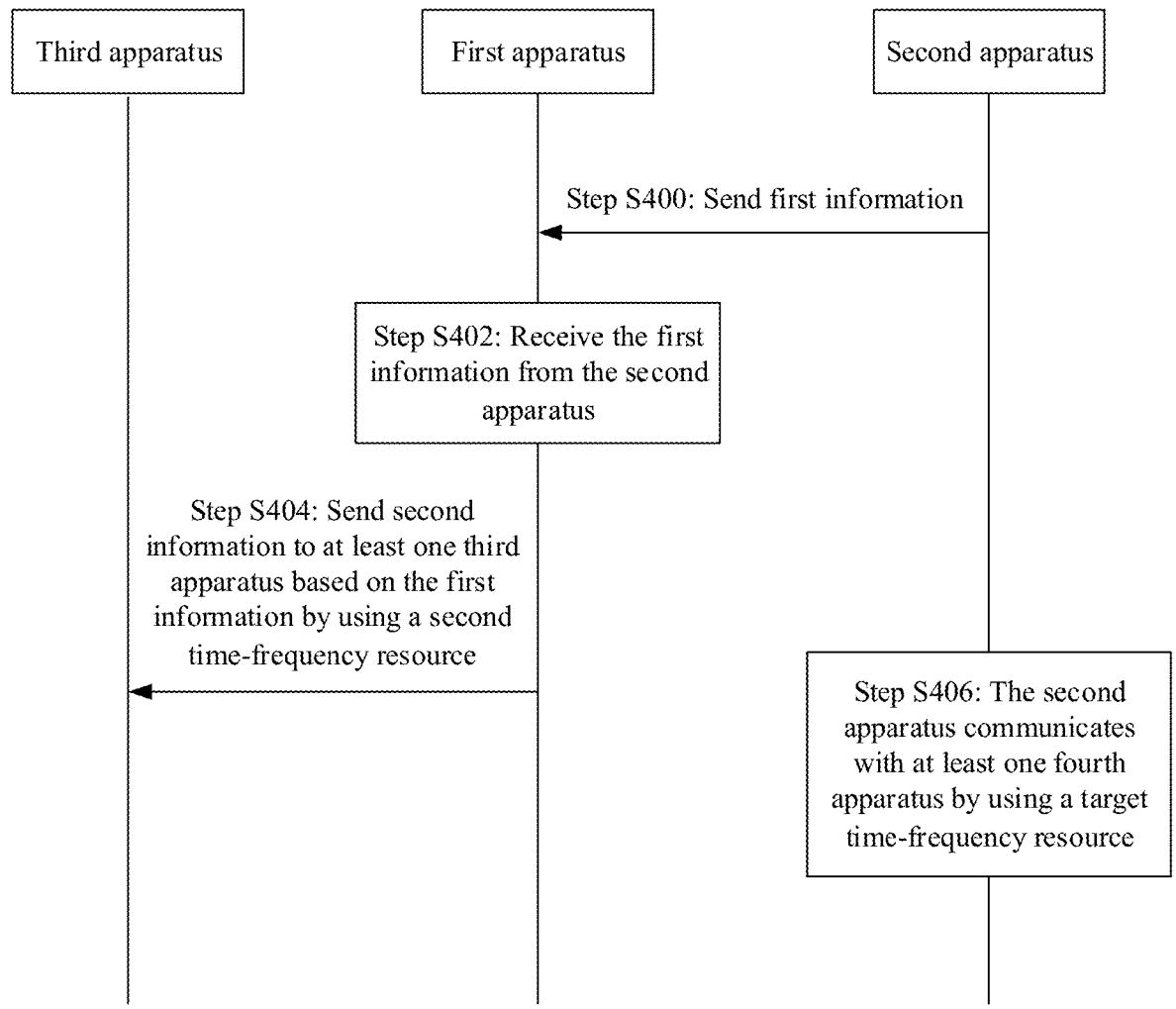
FIG. 4 is a schematic flowchart of a communication method according to an embodiment of this application.

The following provides an explanation with reference to FIG. 4 that is a schematic flowchart of a communication method according to an embodiment of this application. The method may include the following steps.

Step S400: A second apparatus sends first information.

Optionally, the second apparatus determines a first time-frequency resource, and indicates the first time-frequency resource by using the first information.

Specifically, the first information is used to indicate the first time-frequency resource. The first time-frequency resource may be a resource pool reserved by the second apparatus for a target communication domain. The target communication domain may be a communication domain that can detect a second communication domain and that is not subject to resource management by the second communication domain. The first time-frequency resource is neither used for intra-domain communication of the second communication domain nor used for intra-domain communication of a communication domain that is subject to resource management by the second communication domain.

In a possible implementation, the first information may include at least one of a second synchronization signal, a broadcast message, a unicast message, or a multicast message. To be specific, the second apparatus may send the first information by sending the second synchronization signal, or may send the first information by broadcasting the broadcast message, or the like.

When the first information is at least one of the unicast message or the multicast message, the target communication domain may alternatively be a communication domain that can detect the second communication domain and is subject to resource pool allocation by the second communication domain, where the second communication domain is not responsible for specific scheduling.

Step S402: A first apparatus receives the first information from the second apparatus.

To be specific, a first communication domain is one of communication domains that belong to the target communication domain, that is, if the first apparatus of the first communication domain (a primary node of the first communication domain) detects the second communication domain, the first apparatus may receive the first information sent by the second apparatus.

Step S404: The first apparatus sends second information to at least one third apparatus based on the first information by using a second time-frequency resource.

Specifically, the first apparatus parses the first information, learns of the indicated first time-frequency resource, and sends the second information to one or more third apparatuses in the first communication domain by using the second time-frequency resource, that is, sends the second information to the one or more third apparatuses in the first communication domain by using a subset of the first time-frequency resource.

In a possible implementation, the second information includes a first synchronization signal and at least one of service data, control information, or system information. The first apparatus sends the first synchronization signal to the third apparatus by using the second time-frequency resource, and this indicates that the first apparatus is the primary node and the third apparatus is a secondary node in the first communication domain. The first apparatus schedules a communication resource for communication between the primary node and the secondary node in the first communication domain.

Specifically, in embodiments of this application, synchronization signals (including a first synchronization signal, a second synchronization signal, and a third synchronization signal) are signals sent by a primary node. The synchronization signals may be characterized by periodicity, and are used for synchronization between another apparatus and a communication domain that the primary node is in. Alternatively, transmission of the synchronization signals may be aperiodic and implemented by triggering. The service data is data that carries service information, for example, audio data or video data. The control information may be application layer control information, for example, volume adjustment information, or may be access layer control information, for example, scheduling signaling. The system information is information used to indicate a basic configuration parameter of a communication domain, for example, uplink-downlink configuration information or system bandwidth information. The foregoing signal or information is described herein only as an example, and this application also covers other types of information with similar functions.

Further, optionally, the method may further include step S406: The second apparatus communicates with at least one fourth apparatus by using a target time-frequency resource, where the target time-frequency resource and the first time-frequency resource are non-overlapping.

To be specific, intra-domain communication in the second communication domain is performed by using the target time-frequency resource. Because a resource for intra-domain communication in the second communication domain is scheduled by the second apparatus, the target time-frequency resource and the first time-frequency resource can be non-overlapping. In this case, there is no interference between a communication link in the second communication domain and a communication link in the first communication domain. In this way, an inter-domain communication resource coordination mechanism is established. As a result, a resource conflict can be avoided. This method resolves technical problems in the existing technology that a probability that resources used by different communication links overlap is high in a case of medium or heavy load, and mutual interference between the communication links is severe.

An execution occasion of step S406 is not limited in this embodiment of this application. Step S406 is not necessarily performed after step S404, and may be randomly performed between step S400 and step S404, or may be performed simultaneously with one of step S400 to step S404, or may be performed before step S400.

Communication between a primary node and a secondary node in a communication domain may include at least one of the following cases:

The primary node sends a synchronization signal and/or a reference signal to the secondary node;
  the primary node sends system information and/or scheduling information (including at least one of resource scheduling information, available resource information, and modulation and coding scheme information) to the secondary node; and
  the primary node sends service data to the secondary node and/or the secondary node sends service data to the primary node.

The following uses examples for description with reference to a plurality of embodiments.

Embodiment 1: First Information is Carried in a Second Synchronization Signal

Figure 5:
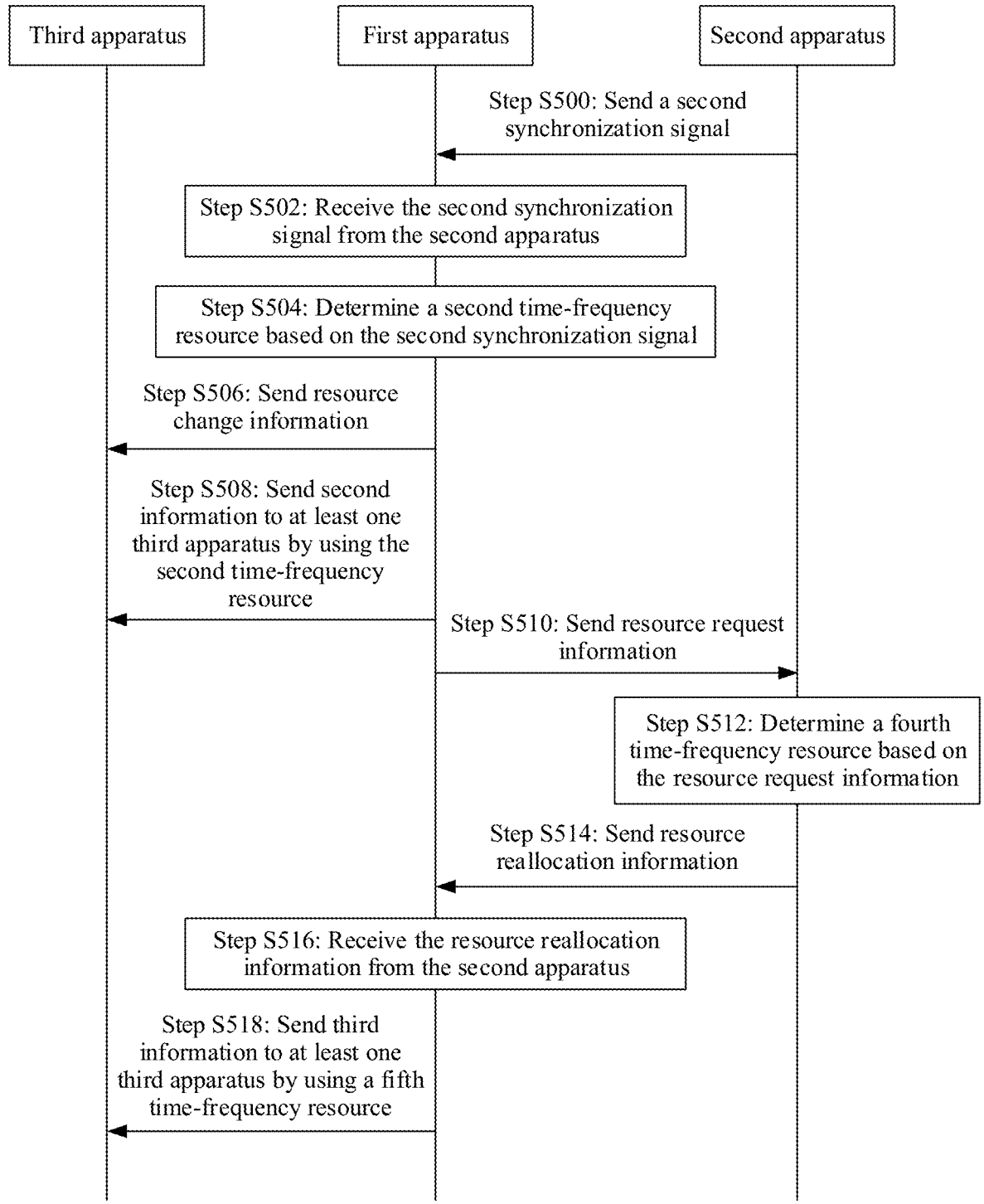
FIG. 5 is a schematic flowchart of a communication method according to another embodiment of this application.

FIG. 5 is a schematic flowchart of a communication method according to another embodiment of this application. The method may include the following steps.

Step S500: A second apparatus sends a second synchronization signal.

Specifically, in this embodiment of this application, the second apparatus may broadcast the second synchronization signal. The second synchronization signal is corresponding to a first time-frequency resource, in other words, first information is carried in the second synchronization signal. The first information is used to indicate the first time-frequency resource. To be specific, the second synchronization signal may carry indication information to indicate the first time-frequency resource.

In a possible implementation, a manner of indicating the first time-frequency resource may be indicating configuration information related to the first time-frequency resource, for example, an uplink-downlink configuration type, or a resource scheduling or mapping type; or indicating information about a time domain resource and/or a frequency domain resource related to the first time-frequency resource, for example, a timing advance, a carrier number, or a frequency offset.

Before step S500, the second apparatus may determine a target time-frequency resource, and the second apparatus communicates with at least one fourth apparatus by using the target time-frequency resource. The target time-frequency resource and the first time-frequency resource are non-overlapping. The non-overlapping herein means that two time-frequency resources do not overlap.

Further, the method further includes step S502: A first apparatus receives the second synchronization signal from the second apparatus.

To be specific, receiving the second synchronization signal by the first apparatus is synonymous with detecting a second communication domain. For example, if a driver or a passenger carrying a mobile phone (that is, the first apparatus) enters a vehicle or is to enter the vehicle, the mobile phone detects a second communication domain of a CDC.

In addition to sending the second synchronization signal, the first apparatus may further send system information and control information. A coverage area of the second synchronization signal is much greater than coverage areas of the system information and the control information. To be specific, the first apparatus may receive the second synchronization signal when the first apparatus is far away from the second apparatus, and the first apparatus receives the system information and the control information only when the first apparatus becomes closer to the second apparatus.

Optionally, the method includes step S504: The first apparatus determines a second time-frequency resource based on the second synchronization signal.

To be specific, the first apparatus may parse the second synchronization signal to learn of the indicated first time-frequency resource. Then the first apparatus determines the second time-frequency resource from the first time-frequency resource, where the second time-frequency resource is a subset of the first time-frequency resource. In other words, the first apparatus selects a part of the first time-frequency resource for communication in a first communication domain.

Step S506: The first apparatus sends resource change information to at least one third apparatus.

The resource change information is specifically used to indicate information about the second time-frequency resource. In other words, the first apparatus may indicate, to the at least one third apparatus by using the resource change information, a time-frequency synchronization adjustment, a resource to be used after the change (the second time-frequency resource is to be used after the change), resource change time, and the like.

A time-frequency synchronization adjustment in embodiments of this application may include a time synchronization adjustment and/or a frequency synchronization adjustment. Indicating a time synchronization adjustment to the at least one third apparatus may be, for example, indicating a timing adjustment value to the at least one third apparatus. Indicating a frequency synchronization adjustment to the at least one third apparatus may be, for example, indicating a frequency domain offset to the at least one third apparatus.

In a possible implementation, a manner of indicating the second time-frequency resource by using the resource change information may be indicating configuration information related to a second time-frequency resource, for example, an uplink-downlink configuration type, or a resource scheduling or mapping type; or indicating information about a time domain resource and/or a frequency domain resource related to the second resource, for example, a timing advance, a carrier number, or a frequency offset. This is not limited in this embodiment of this application, provided that the third apparatus receives the resource change information and can learn of the indicated second time-frequency resource from the resource change information.

In embodiments of this application, the resource change information may alternatively be used to notify only a resource change, but not indicate a specific resource to be used after the change, that is, not indicate which resource is to be used after the change. Subsequently, the third apparatus re-determines a new second time-frequency resource. For example, the third apparatus determines the second time-frequency resource by searching for and detecting the synchronization signal sent by the first apparatus by using the second time-frequency resource (optionally, further receiving a system message sent by the first apparatus by using the second time-frequency resource).

Step S508: The first apparatus sends second information to at least one third apparatus by using the second time-frequency resource.

Specifically, after resource change or resource switching is completed, the first apparatus may send the second information to at least one third apparatus by using the second time-frequency resource, that is, communication in the first communication domain is implemented by using the second time-frequency resource.

The second information may include a first synchronization signal and at least one of a reference signal, service data, control information, or system information.

In a possible implementation, step S508 may further include: The first apparatus receives service data from at least one third apparatus by using the second time-frequency resource.

Further, the method further includes step S510: The first apparatus sends resource request information to the second apparatus.

To be specific, in this embodiment of this application, although currently the first apparatus can send the second information to at least one third apparatus by using the second time-frequency resource, because the second apparatus keeps sending the first information to indicate the first time-frequency resource, the first apparatus may send the resource request information to the second apparatus to re-request a time-frequency resource, to avoid interference caused when a subsequent apparatus learns of the indicated first time-frequency resource and selects a resource that overlaps with the second time-frequency resource for intra-domain communication.

Before step S510, the method may further include: After the first apparatus synchronizes with the second apparatus, that is, after the first apparatus sends the second information to at least one third apparatus by using the second time-frequency resource, the first apparatus establishes a communication connection with the second apparatus to access the second communication domain as a secondary node. After the first apparatus accesses the second communication domain, step S510 in which the first apparatus sends the resource request information to the second apparatus is performed.

Optionally, before step S510, alternatively, after the first apparatus synchronizes with the second apparatus, the first apparatus does not establish the communication connection with the second apparatus, and does not access the second communication domain as the secondary node, and then step S510 in which the first apparatus sends the resource request information to the second apparatus is performed. Alternatively, the first apparatus may not synchronize with the second apparatus, and then step S510 in which the first apparatus sends the resource request information to the second apparatus is performed.

In a possible implementation, the resource request information in this embodiment of this application may include:
at least one of a communication service volume of the first apparatus, a resource requirement of the first apparatus, or channel quality of the first apparatus.

Step S512: The second apparatus determines a fourth time-frequency resource based on the resource request information.

To be specific, after receiving the resource request information sent by the first apparatus, the second apparatus learns that a communication resource needs to be reallocated to the first apparatus. In this case, the second apparatus determines the fourth time-frequency resource. The fourth time-frequency resource may be non-overlapping with the target time-frequency resource, or may be overlapping with the target time-frequency resource. When the fourth time-frequency resource overlaps with the target time-frequency resource, in a communication domain in which the second apparatus is a primary node, the second apparatus may indicate to use a communication resource other than the fourth time-frequency resource in the target time-frequency resource for communication.

In a possible implementation, when the resource request information includes at least one of the communication service volume of the first apparatus, the resource requirement of the first apparatus, or the channel quality of the first apparatus, the foregoing information may be used by the second apparatus to allocate a communication resource to the first apparatus, and to manage and reclaim the communication resource. In this way, utilization of communication resources is optimized, and better allocation of the communication resources can be achieved.

Step S514: The second apparatus sends resource reallocation information to the first apparatus.

To be specific, the resource reallocation information is used to indicate the fourth time-frequency resource, and the resource reallocation information may be carried in a unicast message or a multicast message.

Step S516: The first apparatus receives the resource reallocation information from the second apparatus.

Step S518: The first apparatus sends third information to at least one third apparatus based on the resource reallocation information by using a fifth time-frequency resource.

To be specific, after receiving the resource reallocation information, the first apparatus parses the resource reallocation information to learn the indicated fourth time-frequency resource. Then the first apparatus determines the fifth time-frequency resource from the fourth time-frequency resource, where the fifth time-frequency resource is a subset of the fourth time-frequency resource. In other words, the first apparatus selects a part of the fourth time-frequency resource for communication in the first communication domain. Then the first apparatus may send resource change information to at least one third apparatus, where the resource change information is used to indicate information about the fifth time-frequency resource. In other words, the first apparatus may indicate, to the at least one third apparatus by using the resource change information, at least one of a time-frequency synchronization adjustment, a resource to be used after the change (the fifth time-frequency resource is to be used after the change), resource change time, and the like. In a possible implementation, the first apparatus may send the resource change information to at least one third apparatus by using the second time-frequency resource.

In a possible implementation, the resource change information may be configuration information of the fifth time-frequency resource, or a time domain signal and/or a frequency domain signal related to the fifth time-frequency resource, for example, a carrier number. This is not limited in this embodiment of this application, provided that the third apparatus receives the resource change information and can learn of the indicated fifth time-frequency resource from the resource change information.

In this embodiment of this application, the fourth time-frequency resource and the target time-frequency resource are non-overlapping, and the fourth time-frequency resource and the first time-frequency resource may be non-overlapping or overlapping.

After resource change or resource switching is completed, the first apparatus may send the third information to at least one third apparatus by using the fifth time-frequency resource, that is, communication in the first communication domain is implemented by using the fifth time-frequency resource.

The third information includes a third synchronization signal and at least one of a reference signal, service data, control information, or system information. The third information is information sent by the first apparatus to at least one third apparatus after resource reallocation in this application, and the second information is information sent by the first apparatus to at least one third apparatus before resource reallocation in this application. The third synchronization signal is used for synchronization between the third apparatus and a communication domain in which the first apparatus is a primary node after resource reallocation in this application. The first synchronization signal is used for synchronization between the third apparatus and the communication domain in which the first apparatus is the primary node before resource reallocation in this application. The service data, the control information, or the system information included in the third information is data or information used after resource reallocation in this application; and the service data, the control information, or the system information included in the second information is data or information used before resource reallocation in this application.

In this embodiment of this application, the information used to indicate the first time-frequency resource is carried in the second synchronization signal sent by the second apparatus. In this case, the first apparatus can learn of the indicated first time-frequency resource when detecting the second synchronization signal sent by the second apparatus. A coverage area of the synchronization signal is usually greater than that of the system information or the control information, in other words, compared with the system information or the control information, the indicated first time-frequency resource can be learned of by the first apparatus when the first apparatus is far away from the second apparatus. Therefore, resource coordination can be implemented. When a distance between two communication domains is long, mutual interference between communication links in the two communication domains is very small or there is no mutual interference between the communication links in the two communication domains. Therefore, using the second synchronization signal to carry the first information can avoid interference between the communication links in the two communication domains to the greatest extent.

In addition, in this embodiment of this application, before the first apparatus sends the resource request information to the second apparatus, that is, before coordination, the first apparatus first performs intra-domain communication by using a subset of a resource reserved by the second apparatus (that is, the first time-frequency resource). This can ensure that there is no interference and a service is not interrupted in a resource coordination process. In addition, after the first apparatus sends the resource request information to the second apparatus, the second apparatus allocates, to the first apparatus, a communication time-frequency resource (that is, the fourth time-frequency resource) of the communication domain in which the first apparatus is the primary node. In this way, an inter-domain communication resource coordination mechanism is established. As a result, a resource conflict can be avoided. This method resolves technical problems in the existing technology that a probability that resources used by different communication links overlap is high in a case of medium or heavy load, and mutual interference between the communication links is severe.

Figure 6:
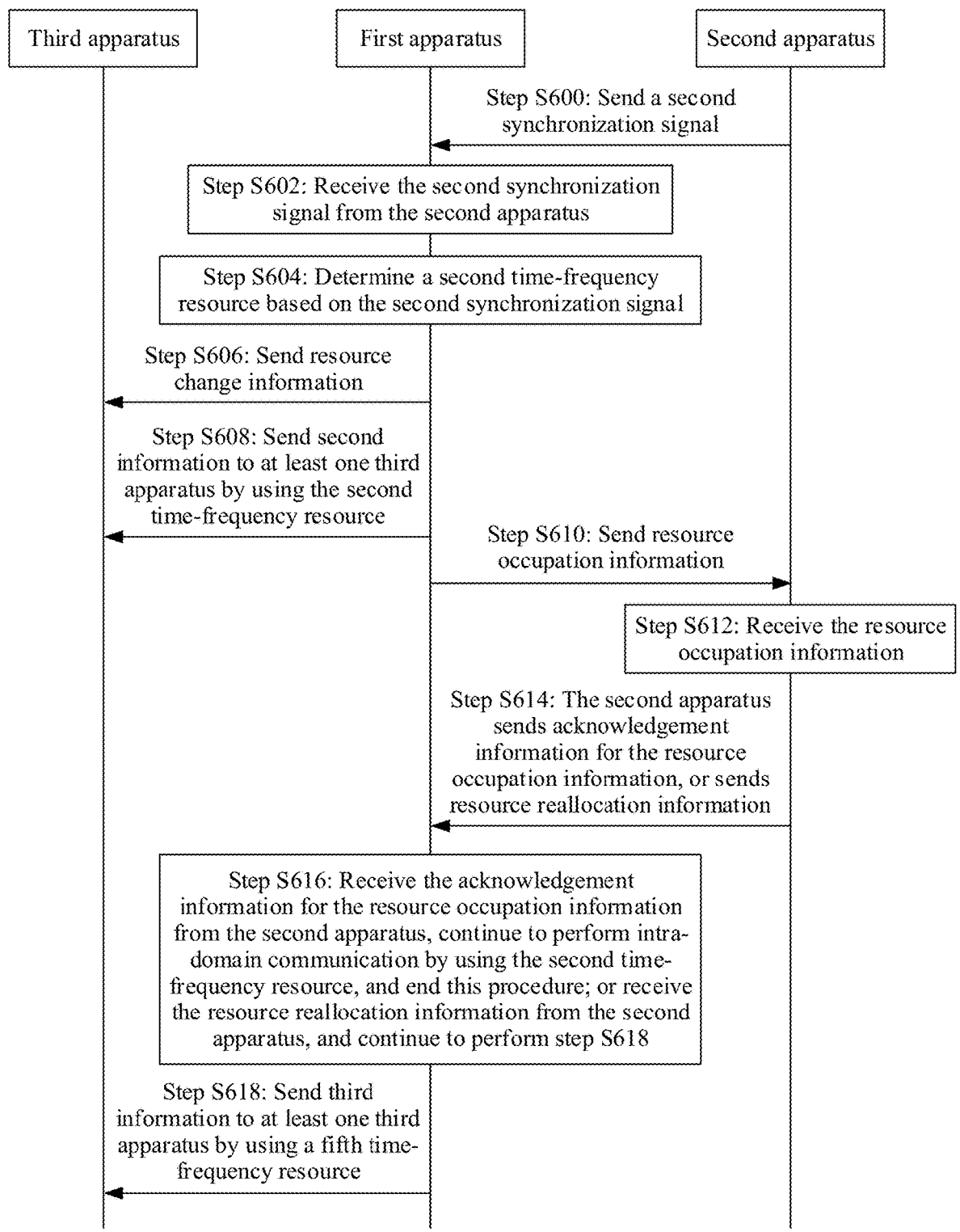
FIG. 6 is a schematic flowchart of a communication method according to another embodiment of this application.

FIG. 6 is a schematic flowchart of a communication method according to another embodiment of this application. The method may include the following steps.

Step S600: A second apparatus sends a second synchronization signal.

Step S602: A first apparatus receives the second synchronization signal from the second apparatus.

Step S604: The first apparatus determines a second time-frequency resource based on the second synchronization signal.

Step S606: The first apparatus sends resource change information to at least one third apparatus.

Step S608: The first apparatus sends second information to at least one third apparatus by using the second time-frequency resource.

For details of step S600 to step S608, refer to description of step S500 to step S508 in the embodiment in FIG. 5. The details are not described herein again.

Step S610: The first apparatus sends resource occupation information to the second apparatus.

To be specific, the resource occupation information is resource occupation information corresponding to the first apparatus, and is used to indicate a third time-frequency resource. The third time-frequency resource includes the second time-frequency resource. The third time-frequency resource may further include a resource different from the second time-frequency resource.

Before step S610, the method may further include: After the first apparatus synchronizes with the second apparatus, that is, after the first apparatus sends the second information to at least one third apparatus by using the second time-frequency resource, the first apparatus establishes a communication connection with the second apparatus to access a second communication domain as a secondary node. After the first apparatus accesses the second communication domain, step S610 in which the first apparatus sends the resource occupation information to the second apparatus is performed.

Optionally, before step S610, alternatively, after the first apparatus synchronizes with the second apparatus, the first apparatus does not establish the communication connection with the second apparatus, and does not access the second communication domain as the secondary node, and then step S610 in which the first apparatus sends the resource occupation information to the second apparatus is performed. Alternatively, the first apparatus may not synchronize with the second apparatus, and then step S610 in which the first apparatus sends the resource occupation information to the second apparatus is performed.

Step S612: The second apparatus receives the resource occupation information.

Step S614: The second apparatus sends acknowledgement information for the resource occupation information, or the second apparatus sends resource reallocation information.

To be specific, after receiving the resource occupation information of the first apparatus, the second apparatus determines whether the first apparatus can occupy the third time-frequency resource. If the second apparatus determines that the first apparatus can occupy the third time-frequency resource, the second apparatus sends the acknowledgement information for the resource occupation information to the first apparatus. In other words, the second apparatus acknowledges occupation of the third time-frequency resource by the first apparatus. Otherwise, the second apparatus sends the resource reallocation information to the first apparatus, to indicate a time-frequency resource that can be occupied by the first apparatus.

After the second apparatus acknowledges occupation of the third time-frequency resource by the first apparatus, the second apparatus may re-determine a reserved resource pool, that is, re-determine another time-frequency resource as a first time-frequency resource. In this case, first information subsequently sent by the second apparatus indicates the re-determined first time-frequency resource to a target communication domain, that is, the first time-frequency resource is changed, where the first time-frequency resource to be used after the change may not overlap with a target time-frequency resource.

It should be noted that, if the second apparatus determines that the first apparatus cannot occupy the third time-frequency resource, in other words, the second apparatus does not acknowledge occupation of the third time-frequency resource by the first apparatus, the second apparatus sends the resource reallocation information to the first apparatus, to indicate a time-frequency resource that can be occupied by the first apparatus. For example, the second apparatus finds that the third time-frequency resource occupied by the first communication domain conflicts (that is, overlaps) with a time-frequency resource in another communication domain, for example, two mobile phones detect the second communication domain almost simultaneously, that is, receive the first information from the second apparatus almost simultaneously; or the second apparatus does not expect to re-determine the reserved resource pool, that is, does not expect to change the original first time-frequency resource. In this case, the second apparatus determines that the first apparatus cannot occupy the third time-frequency resource, and sends the resource reallocation information to the first apparatus, to indicate a time-frequency resource that can be occupied by the first apparatus.

In a possible implementation, after the second apparatus determines that the first apparatus cannot occupy the third time-frequency resource, the second apparatus may directly determine a fourth time-frequency resource for the first apparatus based on the resource occupation information. The resource occupation information may also include at least one of a communication service volume of the first apparatus, a resource requirement of the first apparatus, or channel quality of the first apparatus. In this case, the second apparatus may determine the fourth time-frequency resource for the first apparatus based on the foregoing information included in the resource occupation information.

In a possible implementation, after the second apparatus determines that the first apparatus cannot occupy the third time-frequency resource, the second apparatus may interact with the first apparatus to learn of at least one of the communication service volume of the first apparatus, the resource requirement of the first apparatus, or the channel quality of the first apparatus. In this case, the second apparatus may determine the fourth time-frequency resource for the first apparatus based on the foregoing learned information.

Step S616: The first apparatus receives the acknowledgement information for the resource occupation information from the second apparatus, and continues to perform intra-domain communication by using the second time-frequency resource, and this procedure ends. Alternatively, the first apparatus receives the resource reallocation information from the second apparatus, and continues to perform step S618.

Step S618: The first apparatus sends third information to at least one third apparatus based on the resource reallocation information by using a fifth time-frequency resource.

To be specific, after receiving the resource reallocation information, the first apparatus parses the resource reallocation information to learn the indicated fourth time-frequency resource. Then the first apparatus determines the fifth time-frequency resource from the fourth time-frequency resource, where the fifth time-frequency resource is a subset of the fourth time-frequency resource. In other words, the first apparatus selects a part of the fourth time-frequency resource for communication in the first communication domain. Then the first apparatus may send resource change information to at least one third apparatus, where the resource change information is used to indicate information about the fifth time-frequency resource. In other words, the first apparatus may indicate, to the at least one third apparatus by using the resource change information, a time-frequency synchronization adjustment, a resource to be used after the change (the fifth time-frequency resource is to be used after the change), resource change time, and the like.

The third information is information sent by the first apparatus to at least one third apparatus after resource reallocation in this application, and the second information is information sent by the first apparatus to at least one third apparatus before resource reallocation in this application. A third synchronization signal is used for synchronization between the third apparatus and a communication domain in which the first apparatus is a primary node after resource reallocation in this application. A first synchronization signal is used for synchronization between the third apparatus and the communication domain in which the first apparatus is the primary node before resource reallocation in this application. Service data, control information, or system information included in the third information is data or information used after resource reallocation in this application; and service data, control information, or system information included in the second information is data or information used before resource reallocation in this application.

In a possible implementation, the resource change information may be configuration information of the fifth time-frequency resource, or a time domain signal and/or a frequency domain signal related to the fifth time-frequency resource, for example, a carrier number. This is not limited in this embodiment of this application, provided that the third apparatus receives the resource change information and can learn of the indicated fifth time-frequency resource from the resource change information.

In this embodiment of this application, the fourth time-frequency resource and the target time-frequency resource are non-overlapping, and the fourth time-frequency resource and the first time-frequency resource may also be non-overlapping. In this embodiment of this application, alternatively, the fourth time-frequency resource and the target time-frequency resource may be overlapping.

After resource change or resource switching is completed, the first apparatus may send the third information to at least one third apparatus by using the fifth time-frequency resource, that is, communication in the first communication domain is implemented by using the fifth time-frequency resource.

The third information may include the third synchronization signal and at least one of a reference signal, the service data, the control information, or the system information.

Embodiment 2: First Information is Carried in a Broadcast Message

Figure 7:
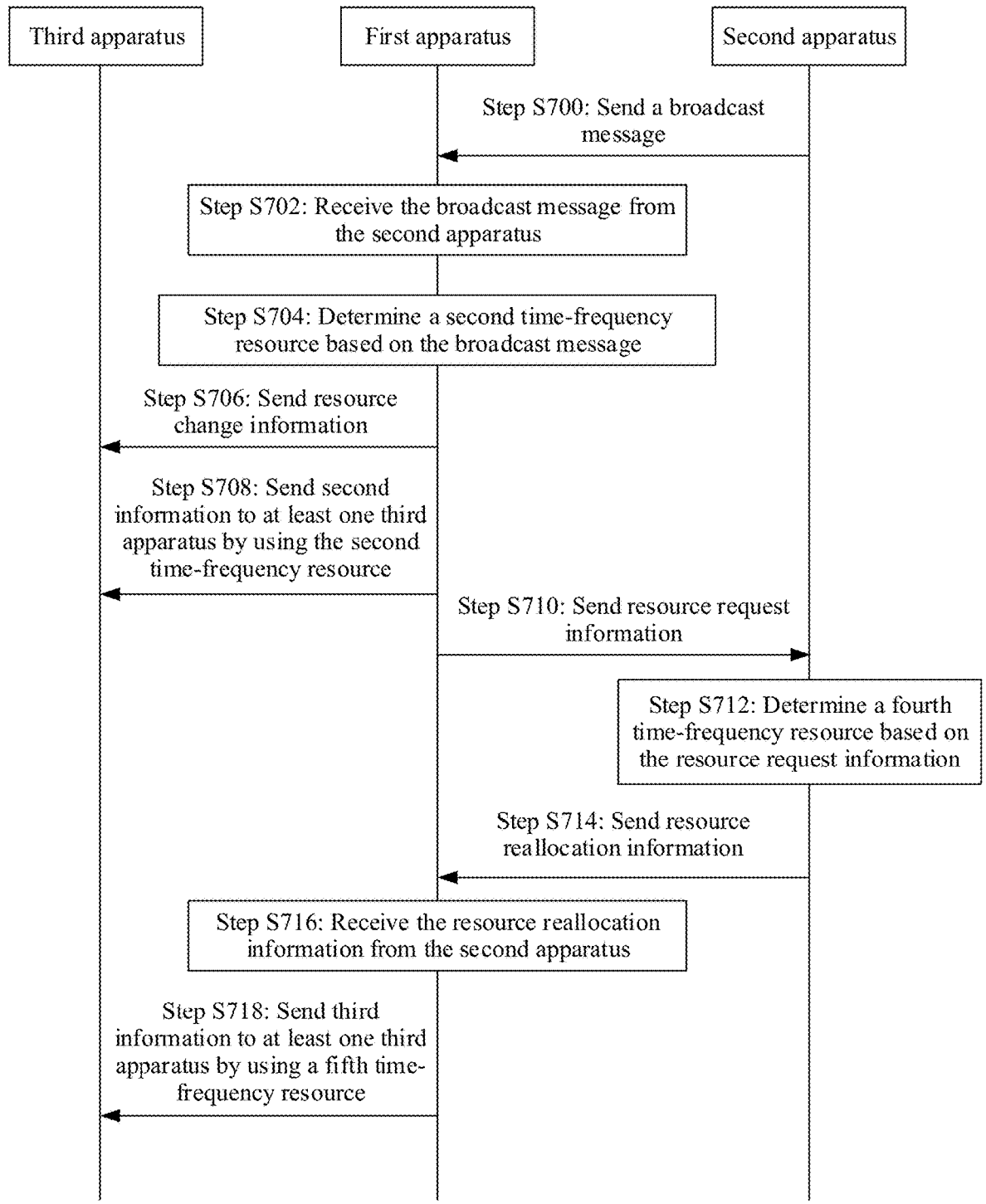
FIG. 7 is a schematic flowchart of a communication method according to another embodiment of this application.

FIG. 7 is a schematic flowchart of a communication method according to another embodiment of this application. The method may include the following steps.

Step S700: A second apparatus sends a broadcast message.

To be specific, in embodiments of this application, the broadcast message sent by the second apparatus by broadcasting may include system information. The broadcast message corresponds to a first time-frequency resource, in other words, the first information is carried in the broadcast message. The first information is used to indicate the first time-frequency resource. To be specific, the second synchronization signal may carry indication information to indicate the first time-frequency resource.

In a possible implementation, time domain information or frequency domain information of the first time-frequency resource is indicated in the broadcast message, for example, at least one of a frame number, a hyper frame number, a channel number, a sub-channel number, or the like is indicated. A structure of a frame or a hyper frame, for example, duration of the frame or the hyper frame, or a channel arrangement of the frame or the hyper frame, may be negotiated and configured by both communication parties, or specified in a protocol.

For example, duration of a hyper frame is 1 millisecond. Further, optionally, each hyper frame includes 48 radio frames. When a frame number of the radio frame is an even number, for example, 0, 2, or 4, a first symbol is a downlink symbol (represented by SD); or when the frame number is an odd number, for example, 1, 3, or 5, the first symbol is an uplink symbol (represented by SU). In this case, one hyper frame may include 24 SDs and 24 SUs.

In another possible implementation, which one of several possible positions is a position of the first time-frequency resource is indicated in the broadcast message. For example, positions of two types of first time-frequency resources are an odd-numbered time unit and an even-numbered time unit. In the broadcast message, a preset identifier may be used to indicate a type of the position of the first time-frequency resource. For example, a preset identifier 0 indicates that the position of the first time-frequency resource is an odd-numbered time unit, and a preset identifier 1 indicates that the position of the first time-frequency resource is an even-numbered time unit.

Before step S700, the second apparatus may determine a target time-frequency resource, and the second apparatus communicates with at least one fourth apparatus by using the target time-frequency resource. The target time-frequency resource and the first time-frequency resource are non-overlapping.

Step S702: A first apparatus receives the broadcast message from the second apparatus.

To be specific, the first apparatus detects a second communication domain. For example, a driver or a passenger carrying a mobile phone (that is, the first apparatus) enters or is to enter a vehicle, and the mobile phone detects that reference signal received power (RSRP) or reference signal received quality (RSRQ) of a synchronization signal sent by a CDC is greater than, or equal to or greater than a preset threshold. For example, the threshold is predefined by using a protocol or preconfigured by using signaling. Subsequently, the first apparatus receives the broadcast message from the second apparatus.

Step S704: The first apparatus determines a second time-frequency resource based on the broadcast message.

To be specific, the first apparatus may parse the broadcast message to learn of the indicated first time-frequency resource. Then the first apparatus determines the second time-frequency resource from the first time-frequency resource, where the second time-frequency resource is a subset of the first time-frequency resource. In other words, the first apparatus determines a part of the first time-frequency resource for communication in a first communication domain.

Step S706: The first apparatus sends resource change information to at least one third apparatus.

Step S708: The first apparatus sends second information to at least one third apparatus by using the second time-frequency resource.

Step S710: The first apparatus sends resource request information to the second apparatus.

Step S712: The second apparatus determines a fourth time-frequency resource based on the resource request information.

Step S714: The second apparatus sends resource reallocation information to the first apparatus.

Step S716: The first apparatus receives the resource reallocation information from the second apparatus.

Step S718: The first apparatus sends third information to at least one third apparatus based on the resource reallocation information by using a fifth time-frequency resource.

For details of step S706 to step S718, refer to description of step S506 to step S518 in the embodiment in FIG. 5. The details are not described herein again.

In this embodiment of this application, the information used to indicate the first time-frequency resource is carried in the broadcast message sent by the second apparatus. In this case, the first apparatus can learn of the indicated first time-frequency resource when detecting the broadcast message sent by the second apparatus, so that an inter-domain communication resource coordination mechanism is established. As a result, a resource conflict can be avoided. This method resolves technical problems in the conventional technology that a probability that resources used by different communication links overlap is high in a case of medium or heavy load, and mutual interference between the communication links is severe.

In a possible implementation, step S710 to step S718 in this embodiment may be replaced with step S610 to step S618 in the embodiment in FIG. 6.

Figure 8:
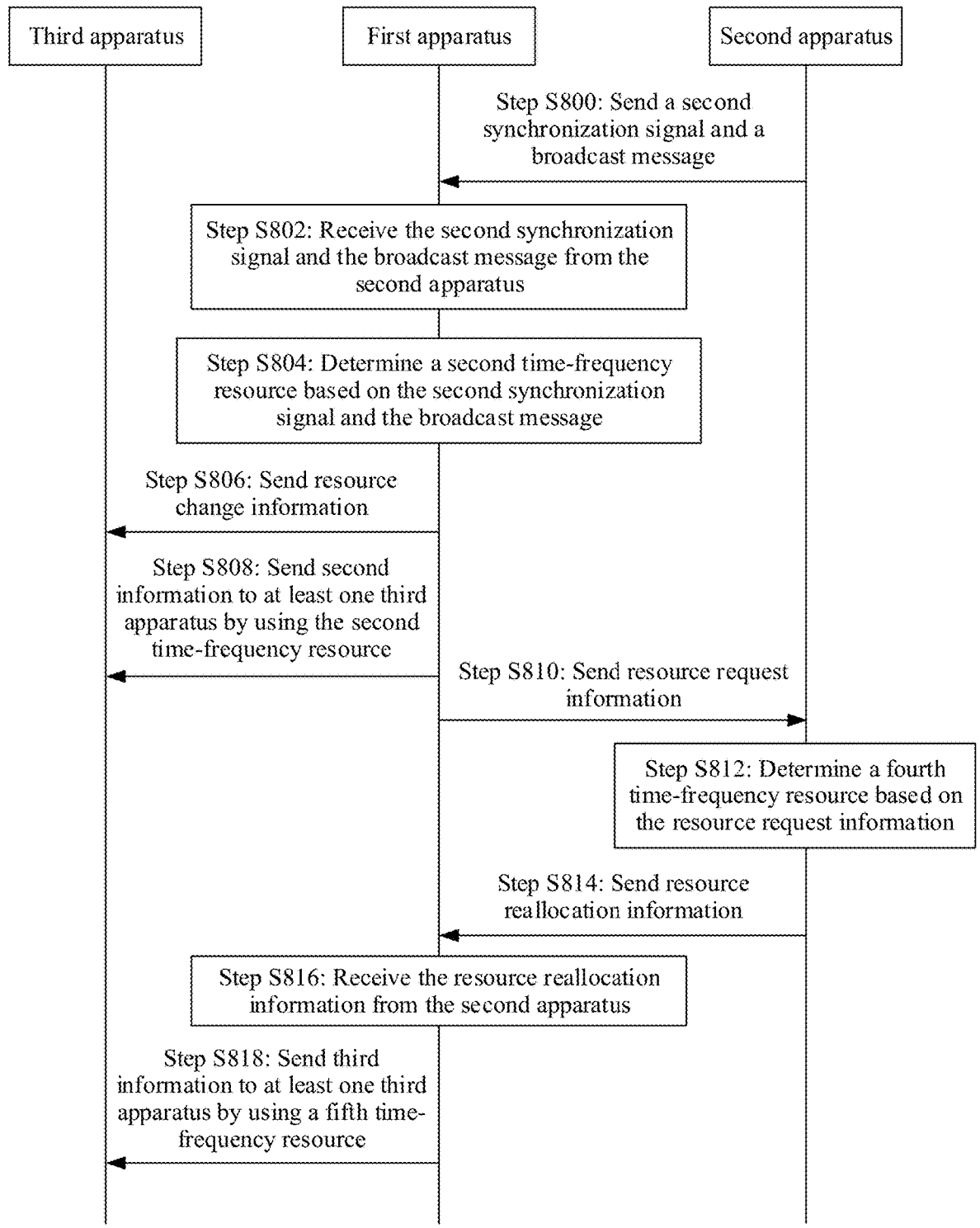
FIG. 8 is a schematic flowchart of a communication method according to another embodiment of this application.

Embodiment 3: First Information is Carried in a Second Synchronization Signal and a Broadcast Message FIG. 8 is a schematic flowchart of a communication method according to another embodiment of this application. The method may include the following steps.

Step S800: A second apparatus sends a second synchronization signal and a broadcast message.

To be specific, in this embodiment of this application, information about a first time-frequency resource may be jointly indicated by using the second synchronization signal and the broadcast message, that is, first information is carried in the second synchronization signal and the broadcast message. For example, partial information in the second synchronization signal is combined with partial information in the broadcast message to obtain information used to indicate the first time-frequency resource, that is, the first information.

In a possible implementation, a plurality of groups of possible positions of the first time-frequency resource are preset in a protocol, and there are a plurality of positions of the first time-frequency resource in each group. In this case, when the information about the first time-frequency resource is jointly indicated by using the second synchronization signal and the broadcast message, a circular shift value or an identifier of the second synchronization signal may be specifically used to indicate which group that the position of the first time-frequency resource is in among the plurality of preset groups, and then the broadcast message indicates which position is the position of the first time-frequency resource in the group. In other words, the circular shift value or the identifier of the second synchronization signal is used to indicate a group identifier of the group that the first time-frequency resource is in, and the broadcast message is used to indicate information such as a sub-identifier, a position, or an index of the first time-frequency resource in the group that the first time-frequency resource is in.

Before step S800, the second apparatus may determine a target time-frequency resource, and the second apparatus communicates with at least one fourth apparatus by using the target time-frequency resource. The target time-frequency resource and the first time-frequency resource are non-overlapping.

Step S802: A first apparatus receives the second synchronization signal and the broadcast message from the second apparatus.

Step S804: The first apparatus determines a second time-frequency resource based on the second synchronization signal and the broadcast message.

To be specific, the first apparatus may parse the second synchronization signal and the broadcast message to learn of the indicated first time-frequency resource. Then the first apparatus determines the second time-frequency resource from the first time-frequency resource, where the second time-frequency resource is a subset of the first time-frequency resource. In other words, the first apparatus determines a part of the first time-frequency resource for communication in a first communication domain.

Step S806: The first apparatus sends resource change information to at least one third apparatus.

Step S808: The first apparatus sends second information to at least one third apparatus by using the second time-frequency resource.

Step S810: The first apparatus sends resource request information to the second apparatus.

Optionally, the method includes step S812: The second apparatus determines a fourth time-frequency resource based on the resource request information.

Step S814: The second apparatus sends resource reallocation information to the first apparatus.

Step S816: The first apparatus receives the resource reallocation information from the second apparatus.

Step S818: The first apparatus sends third information to at least one third apparatus based on the resource reallocation information by using a fifth time-frequency resource.

For details of step S806 to step S818, refer to description of step S506 to step S518 in the embodiment in FIG. 5. The details are not described herein again.

In this embodiment of this application, the information about the first time-frequency resource is jointly indicated by the second synchronization signal and the broadcast message. In this case, the first apparatus can learn of the indicated first time-frequency resource when receiving and parsing the second synchronization signal and the broadcast message sent by the second apparatus, so that an inter-domain communication resource coordination mechanism is established. As a result, a resource conflict can be avoided. This method resolves technical problems in the conventional technology that a probability that resources used by different communication links overlap is high in the case of medium or high load, and mutual interference between the communication links is severe.

In a possible implementation, step S810 to step S818 in this embodiment may be replaced with step S610 to step S618 in the embodiment in FIG. 6.

Embodiment 4: First Information is Carried in a First Multicast Message

Figure 9:
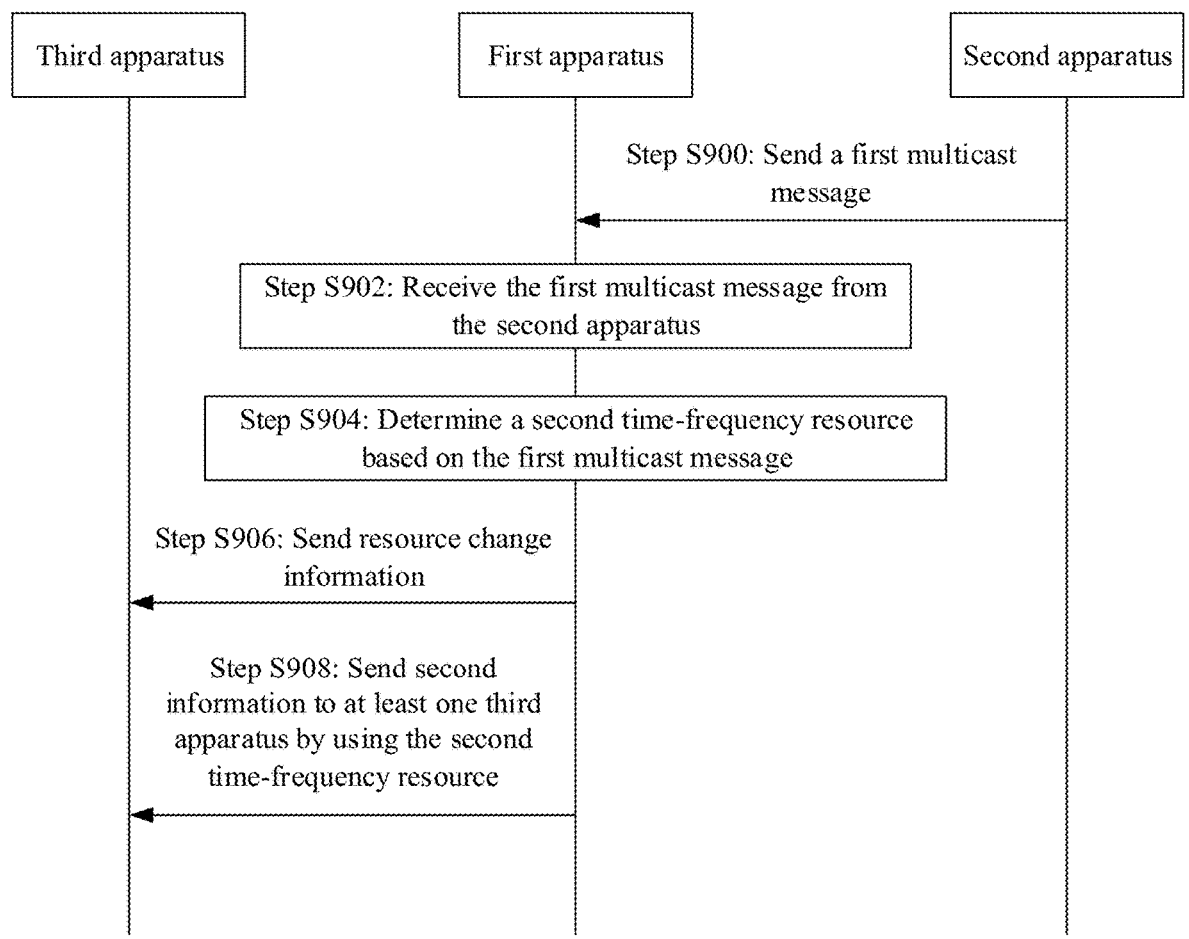
FIG. 9 is a schematic flowchart of a communication method according to another embodiment of this application.

FIG. 9 is a schematic flowchart of a communication method according to another embodiment of this application. The method may include the following steps.

Step S900: A second apparatus sends a first multicast message.

To be specific, in this embodiment of this application, first information may be carried in the first multicast message. Multicast refers to a "one-to-many" communication mode, and communication nodes in a same group may receive a corresponding multicast message. For example, a primary node may send data or a message to a plurality of secondary nodes in a group simultaneously, and it can be ensured that communication of other communication nodes that are not in the group is not affected. The first multicast message is used to indicate a first time-frequency resource. To be specific, the first multicast message may carry indication information to indicate the first time-frequency resource.

In a possible implementation, a plurality of first time-frequency resources may be indicated in the multicast message. For example, a first apparatus may determine, based on an ID of the first apparatus, which of the plurality of first time-frequency resources is a first time-frequency resource corresponding to the first apparatus. For example, the ID of the first apparatus may be specifically an identifier allocated or set by the second apparatus for the first apparatus, or may be an identifier of an attribute of the first apparatus, for example, an ID of a physical layer, or an ID of a media access control MAC layer (for example, a MAC address). The ID of the first apparatus is not specifically limited in this embodiment of this application, provided that the ID can uniquely identify the first apparatus.

Before step S900, the second apparatus may determine a target time-frequency resource, and the second apparatus communicates with at least one fourth apparatus by using the target time-frequency resource. The target time-frequency resource and the first time-frequency resource are non-overlapping.

Step S902: The first apparatus receives the first multicast message from the second apparatus.

To be specific, there is at least one device group in a second communication domain, the first apparatus joins a target device group in the second communication domain, and the second apparatus sends the first multicast message to the target device group. The first apparatus receives the first multicast message from the second apparatus. To be specific, before the second apparatus sends the first multicast message, that is, before step S900, a device connection is established between the first apparatus and the second apparatus, and the first apparatus joins the target device group in the second communication domain.

In a possible implementation, after the device connection is established between the first apparatus and the second apparatus, before step S900, the method may further include: The first apparatus sends resource request information to the second apparatus, where the resource request information is used to request a time-frequency resource. After receiving the resource request information, the second apparatus determines the first time-frequency resource, and then performs step S900.

In a possible implementation, the resource request information may include:

at least one of a communication service volume of the first apparatus, a resource requirement of the first apparatus, or channel quality of the first apparatus. In this case, the second apparatus may allocate a communication resource to the first apparatus based on the foregoing information included in the resource request information, and manage and reclaim the communication resource. In this way, utilization of communication resources is optimized, and better allocation of the communication resources can be achieved.

In another possible implementation, after the communication connection is established between the first apparatus and the second apparatus, before step S900, the method may further include: The first apparatus sends resource occupation information to the second apparatus; and after receiving the resource occupation information, the second apparatus determines whether the first apparatus can occupy a third time-frequency resource, and performs step S900 when determining that the first apparatus cannot occupy the third time-frequency resource. For details, refer to related description of step S614 in the embodiment in FIG. 6.

Step S904: The first apparatus determines a second time-frequency resource based on the first multicast message.

To be specific, the first apparatus may parse the first multicast message to learn of the indicated first time-frequency resource. Then the first apparatus determines the second time-frequency resource from the first time-frequency resource, where the second time-frequency resource is a subset of the first time-frequency resource. In other words, the first apparatus selects a part of the first time-frequency resource for communication in a first communication domain.

Step S906: The first apparatus sends resource change information to at least one third apparatus.

The resource change information is specifically used to indicate information about the second time-frequency resource. In other words, the first apparatus may indicate, to the at least one third apparatus by using the resource change information, a time-frequency synchronization adjustment, a resource to be used after the change (the second time-frequency resource is to be used after the change), resource change time, and the like.

In a possible implementation, the resource change information may be configuration information of the second time-frequency resource, or a time domain signal and/or a frequency domain signal related to the second time-frequency resource, for example, a carrier number. This is not limited in this embodiment of this application, provided that the third apparatus receives the resource change information and can learn of the indicated second time-frequency resource from the resource change information.

Step S908: The first apparatus sends second information to at least one third apparatus by using the second time-frequency resource.

Specifically, after resource change or resource switching is completed, the first apparatus may send the second information to at least one third apparatus by using the second time-frequency resource, that is, communication in the first communication domain is implemented by using the second time-frequency resource.

The second information may include a first synchronization signal and at least one of a reference signal, service data, control information, or system information.

In a possible implementation, step S908 may further include: The first apparatus receives service data from at least one third apparatus by using the second time-frequency resource.

In this embodiment of this application, the information used to indicate the first time-frequency resource is carried in the first multicast message sent by the second apparatus. In this case, the first apparatus can learn of the indicated first time-frequency resource when detecting the first multicast message sent by the second apparatus, so that an inter-domain communication resource coordination mechanism is established. As a result, a resource conflict can be avoided. This method resolves technical problems in the conventional technology that a probability that resources used by different communication links overlap is high in a case of medium or heavy load, and mutual interference between the communication links is severe.

Embodiment 5: First Information is Carried in a First Unicast Message

Figure 10:
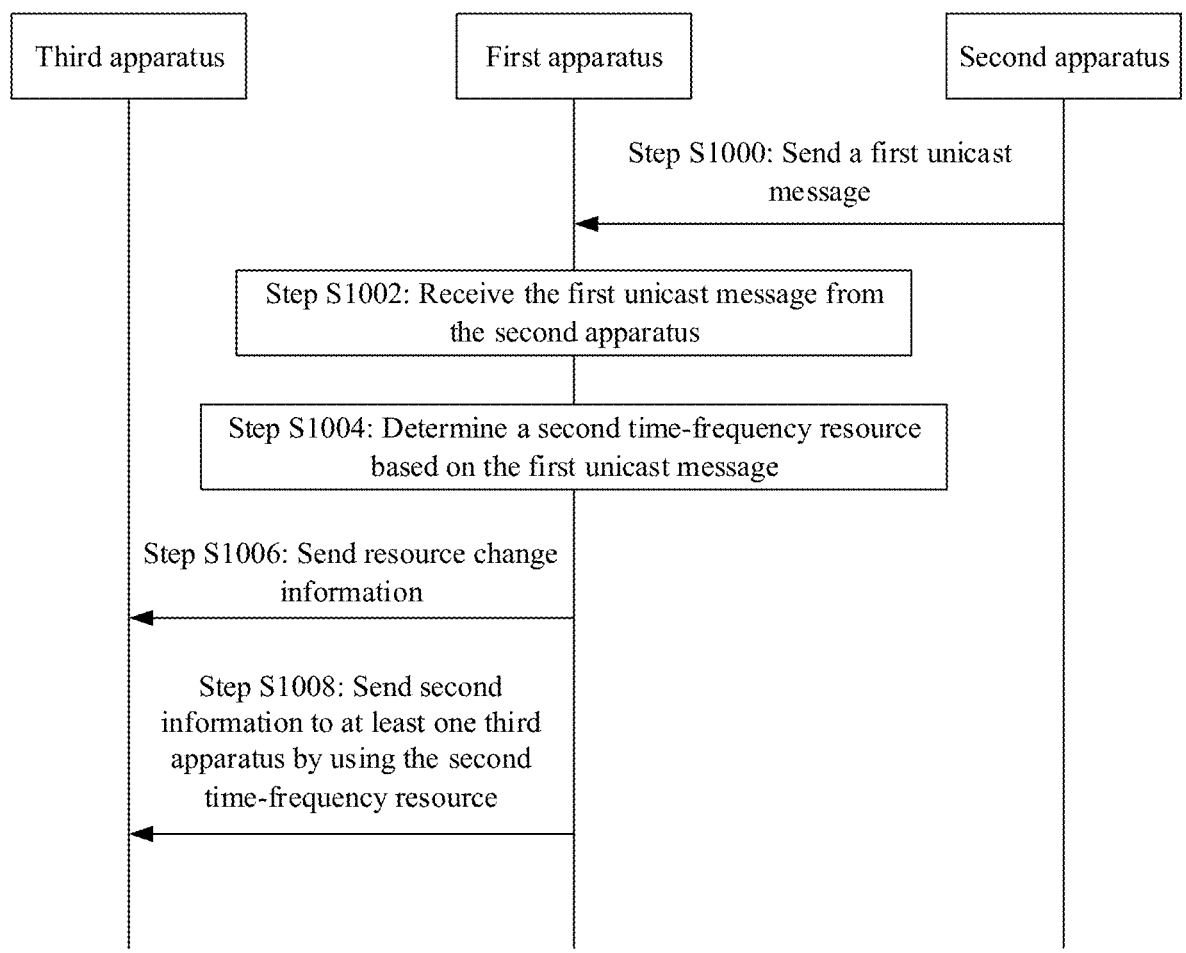
FIG. 10 is a schematic flowchart of a communication method according to another embodiment of this application.

FIG. 10 is a schematic flowchart of a communication method according to another embodiment of this application. The method may include the following steps.

Step S1000: A second apparatus sends a first unicast message.

To be specific, in this embodiment of this application, first information may be carried in the first unicast message. Unicast refers to a "one-to-one" communication mode. The first unicast message corresponds to a first time-frequency resource, in other words, the first information is carried in the first unicast message. The first unicast message is used to indicate the first time-frequency resource. To be specific, the first unicast message may carry indication information to indicate the first time-frequency resource.

The second apparatus sends the first unicast message to the first apparatus according to a communication address of the first apparatus. To be specific, before the second apparatus sends the first unicast message, that is, before step S1000, the first apparatus receives a broadcast message that is sent by the second apparatus and that is used for connection establishment, and establishes a communication connection with the second apparatus.

In a possible implementation, after the communication connection is established between the first apparatus and the second apparatus, before step S1000, the method may further include: The first apparatus sends resource request information to the second apparatus, where the resource request information is used to request a time-frequency resource. After receiving the resource request information, the second apparatus determines the first time-frequency resource, and then performs step S1000.

In a possible implementation, the resource request information may include:

at least one of a communication service volume of the first apparatus, a resource requirement of the first apparatus, or channel quality of the first apparatus. The second apparatus allocates a communication resource to the first apparatus based on the foregoing information, and manage and reclaim the communication resource. In this way, utilization of communication resources is optimized, and better allocation of the communication resources can be achieved.

In another possible implementation, after the communication connection is established between the first apparatus and the second apparatus, before step S1000, the method may further include: The first apparatus sends resource occupation information to the second apparatus; and after receiving the resource occupation information, the second apparatus determines whether the first apparatus can occupy a third time-frequency resource, and performs step S1000 when determining that the first apparatus cannot occupy the third time-frequency resource. For details, refer to related description of step S614 in the embodiment in FIG. 6.

Before step S1000, the second apparatus may determine a target time-frequency resource, and the second apparatus communicates with at least one fourth apparatus by using the target time-frequency resource. The target time-frequency resource and the first time-frequency resource are non-overlapping.

Step S1002: The first apparatus receives the first unicast message from the second apparatus.

Step S1004: The first apparatus determines a second time-frequency resource based on the first unicast message.

To be specific, the first apparatus may parse the first unicast message to learn of the indicated first time-frequency resource. Then the first apparatus determines the second time-frequency resource from the first time-frequency resource, where the second time-frequency resource is a subset of the first time-frequency resource. In other words, the first apparatus selects a part of the first time-frequency resource for communication in a first communication domain.

Step S1006: The first apparatus sends resource change information to at least one third apparatus.

Step S1008: The first apparatus sends second information to at least one third apparatus by using the second time-frequency resource.

For details of step S1006 to step S1008, refer to description of step S906 to step S908 in the embodiment in FIG. 9. The details are not described herein again.

In this embodiment of this application, the information used to indicate the first time-frequency resource is carried in the first unicast message sent by the second apparatus. In this case, the first apparatus can learn of the indicated first time-frequency resource when detecting the first unicast message sent by the second apparatus, so that an inter-domain communication resource coordination mechanism is established. As a result, a resource conflict can be avoided. This method resolves technical problems in the conventional technology that a probability that resources used by different communication links overlap is high in a case of medium or heavy load, and mutual interference between the communication links is severe.

Figure 11:
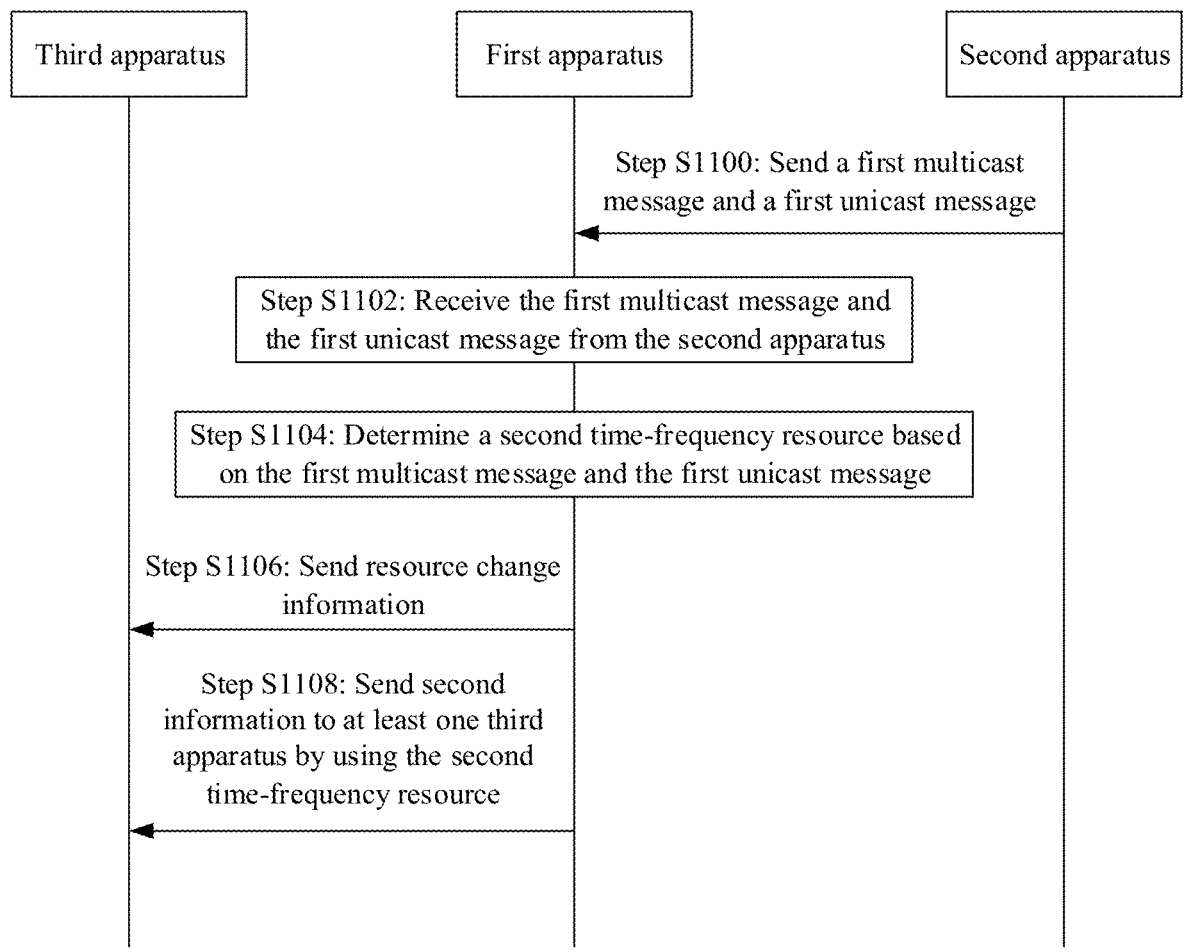
FIG. 11 is a schematic flowchart of a communication method according to another embodiment of this application.

Embodiment 6: First Information is Carried in a First Multicast Message and a First Unicast Message FIG. 11 is a schematic flowchart of a communication method according to another embodiment of this application. The method may include the following steps.

Step S1100: A second apparatus sends a first multicast message and a first unicast message.

To be specific, in this embodiment of this application, information about a first time-frequency resource may be jointly indicated by using the first multicast message and the first unicast message, that is, first information is carried in the first multicast message and the first unicast message. For example, partial information in the first multicast message is combined with partial information in the first unicast message to obtain information used to indicate the first time-frequency resource, that is, the first information.

In a possible implementation, when the first multicast message and the first unicast message jointly indicate the information about the first time-frequency resource, the multicast message may be used to indicate a plurality of first time-frequency resources, and then the unicast message is used to indicate a first time-frequency resource to be used in the plurality of first time-frequency resources.

Before step S1100, the second apparatus may determine a target time-frequency resource, and the second apparatus communicates with at least one fourth apparatus by using the target time-frequency resource. The target time-frequency resource and the first time-frequency resource are non-overlapping.

Step S1102: The first apparatus receives the first multicast message and the first unicast message from the second apparatus.

To be specific, the first apparatus joins a group that the second apparatus is in, and the first apparatus receives the first multicast message from the second apparatus. In other words, before the second apparatus sends the first multicast message, that is, before step S1100, the first apparatus receives a broadcast message that is sent by the second apparatus and that is used for connection establishment, and establishes a communication connection with the second apparatus. Then the first apparatus receives the first multicast message and the first unicast message from the second apparatus.

In a possible implementation, after the communication connection is established between the first apparatus and the second apparatus, before step S1100, the method may further include: The first apparatus sends resource request information to the second apparatus, where the resource request information is used to request a time-frequency resource. After receiving the resource request information, the second apparatus determines the first time-frequency resource, and then performs step S1100.

In a possible implementation, the resource request information may include:

at least one of a communication service volume of the first apparatus, a resource requirement of the first apparatus, or channel quality of the first apparatus. The second apparatus allocates a communication resource to the first apparatus based on the foregoing information, and manage and reclaim the communication resource. In this way, utilization of communication resources is optimized, and better allocation of the communication resources can be achieved.

In another possible implementation, after the communication connection is established between the first apparatus and the second apparatus, before step S1100, the method may further include: The first apparatus sends resource occupation information to the second apparatus; and after receiving the resource occupation information, the second apparatus determines whether the first apparatus can occupy a third time-frequency resource, and performs step S1100 when determining that the first apparatus cannot occupy the third time-frequency resource. For details, refer to related description of step S614 in the embodiment in FIG. 6.

Step S1104: The first apparatus determines a second time-frequency resource based on the first multicast message and the first unicast message.

To be specific, the first apparatus may parse the first multicast message and the first unicast message to learn of the indicated first time-frequency resource. Then the first apparatus determines the second time-frequency resource from the first time-frequency resource, where the second time-frequency resource is a subset of the first time-frequency resource. In other words, the first apparatus determines a part of the first time-frequency resource for communication in a first communication domain.

Step S1106: The first apparatus sends resource change information to at least one third apparatus.

Step S1108: The first apparatus sends second information to at least one third apparatus by using the second time-frequency resource.

For details of step S1106 to step S1108, refer to description of step S906 to step S908 in the embodiment in FIG. 9. The details are not described herein again.

In this embodiment of this application, the information used to indicate the first time-frequency resource is carried in the first multicast message and the first unicast message sent by the second apparatus. In this case, the first apparatus can learn of the indicated first time-frequency resource when detecting the first multicast message and the first unicast message sent by the second apparatus, so that an inter-domain communication resource coordination mechanism is established. As a result, a resource conflict can be avoided. This method resolves technical problems in the conventional technology that a probability that resources used by different communication links overlap is high in a case of medium or heavy load, and mutual interference between the communication links is severe.

Based on all the foregoing possible embodiments, in a possible implementation, the first time-frequency resource is discontinuous in time domain.

To be specific, in embodiments of this application, the first time-frequency resource is composed of discontinuous time-frequency resources in time domain. For example, if the first time-frequency resource includes only odd-numbered frames (or hyper frames), when performing intra-domain communication by using the second time-frequency resource (the subset of the first time-frequency resource), the first apparatus may communicate with the second apparatus at even-numbered frames (or hyper frames). For another example, numbers of frames included in the first time-frequency resource may be a plurality of groups of numbers. Numbers in each group may be consecutive or inconsecutive, and numbers of the groups are inconsecutive. For example, a first group includes numbers 1, 2, and 3, and a second group includes numbers 7 and 8. The second time-frequency resource used by the first apparatus is also discontinuous in time domain.

Similarly, the fourth time-frequency resources in embodiments of this application may also be discontinuous in time domain.

When the first apparatus and the second apparatus serve as primary nodes simultaneously, if receiving and sending times of the first apparatus and the second apparatus are the same, the first apparatus cannot receive a signal and information transmitted by the second apparatus, and cannot complete operations such as synchronizing with the second apparatus, receiving system information, transmitting a resource request, and obtaining information about resource scheduling performed by the second apparatus for a communication domain that the first apparatus is in. In embodiments of this application, it is specified that the first time-frequency resource or the fourth time-frequency resource is discontinuous in time domain, so that the foregoing technical problems can be resolved. The first apparatus may complete, in time domain other than time domain that the first time-frequency resource or the fourth time-frequency resource is in, the operations such as synchronizing with the second apparatus, receiving system information, transmitting a resource request, and obtaining information about resource scheduling performed by the second apparatus for the communication domain that the first apparatus is in. In other words, interaction between the first apparatus and the second apparatus and interaction between the first apparatus and another apparatus in the communication domain that the first apparatus is in are implemented at different times.

In a possible implementation, manners of determining the first time-frequency resource, the second time-frequency resource, the fourth time-frequency resource, or the fifth time-frequency resource may be as follows.

1. A time-frequency resource is specified by a communication protocol. To be specific, both communication parties may learn of a specific time-frequency resource according to the communication protocol. In this case, the first information in embodiments of this application may be only a specific identifier or a preset identifier, and both communication parties know a function or a meaning of the specific identifier or the preset identifier. To be specific, the second apparatus sends the specific identifier or the preset identifier, to indicate the first apparatus to perform intra-domain communication based on a time-frequency resource specified in the communication protocol. The first apparatus receives the specific identifier or the preset identifier, that is, to learn of the time-frequency resource specified in the communication protocol, so as to perform intra-domain communication.

2. A time-frequency resource is determined and allocated by the second apparatus. That is, the first information sent by the second apparatus includes information about a determined time-frequency resource, and the first apparatus learns of, by parsing the first information, a time-frequency resource determined and allocated by the second apparatus.

The second apparatus allocates different time-frequency resources to different target communication domain. The second apparatus determines, based on a time-frequency resource occupied or used by a current target communication domain, to determine and allocate another non-overlapping time-frequency resource to a new target communication domain. For example, if the current target communication domain (the communication domain in which the first apparatus is a primary node) performs intra-domain communication based on the second time-frequency resource in the first time-frequency resource, when the second apparatus is to allocate a time-frequency resource to another target communication domain, the second apparatus determines a sixth time-frequency resource based on the first time-frequency resource and the second time-frequency resource, and allocates the sixth time-frequency resource to the another communication domain. The sixth time-frequency resource does not overlap with the second time-frequency resource, the first resource, or the target time-frequency resource.

3. A time-frequency resource is determined by using at least one of time information, frequency information, code information, and the like in the second synchronization signal transmitted by the second apparatus. A determining method or algorithm may be specified in a communication protocol. The second synchronization signal may include a primary synchronization signal and/or a secondary synchronization signal.

It may be understood that the two connection manners provided above are two example connection manners, and a connection between two electronic devices in actual application is not limited to the foregoing two connection manners.

The method in embodiments of this application is described above in detail, and an apparatus in embodiments of this application is provided below.

Figure 12:
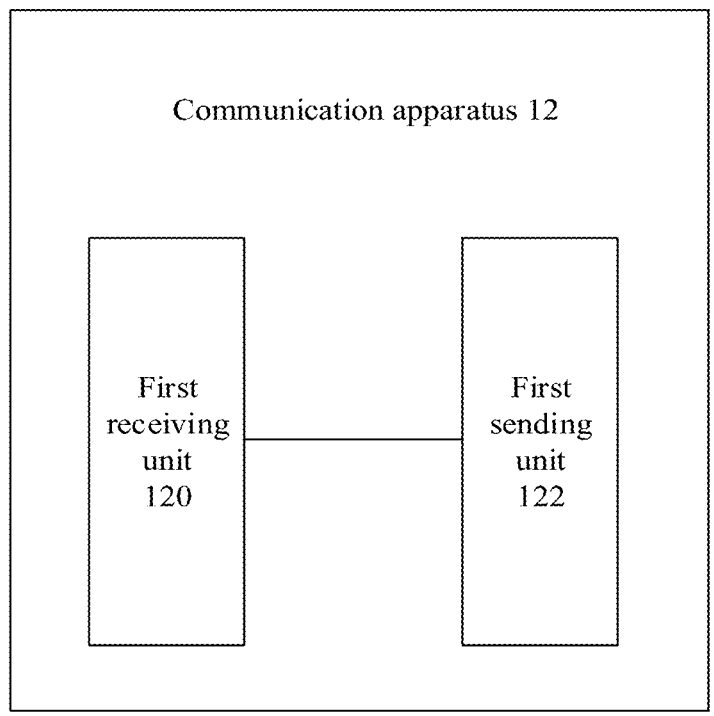
FIG. 12 is a schematic diagram of a structure of a communication apparatus according to an embodiment of this application.

Refer to FIG. 12. FIG. 12 is a schematic diagram of a structure of a communication apparatus according to an embodiment of this application. The communication apparatus 12 may include a first receiving unit 120 and a first sending unit 122. Detailed description of the units is as follows.

The first receiving unit 120 is configured to receive first information from a second apparatus, where the first information is used to indicate a first time-frequency resource.

The first sending unit 122 is configured to send second information to at least one third apparatus based on the first information by using a second time-frequency resource, where the second information includes a first synchronization signal and at least one of service data, control information, or system information, and the second time-frequency resource is a subset of the first time-frequency resource.

In a possible implementation, the first receiving unit 120 is further configured to receive service data from at least one third apparatus by using the second time-frequency resource.

In a possible implementation, the first information is carried in at least one of a second synchronization signal, a broadcast message, a unicast message, or a multicast message.

In a possible implementation, the first information is carried in the second synchronization signal, or carried in the first time-frequency resource corresponding to the second synchronization signal.

In a possible implementation, the first information is carried in the broadcast message.

In a possible implementation, the first information is carried in the second synchronization signal and the broadcast message, and the second synchronization signal and the broadcast message jointly indicate the first time-frequency resource.

In a possible implementation, the first information is carried in at least one of a first multicast message or a first unicast message.

In a possible implementation, the first sending unit 122 is further configured to send resource change information to the at least one third apparatus, where the resource change information is used to indicate information about the second time-frequency resource.

In a possible implementation, the first sending unit 122 is further configured to send resource request information to the second apparatus.

In a possible implementation, the resource request information includes:

at least one of a communication service volume of a first apparatus, a resource requirement of the first apparatus, or channel quality of the first apparatus.

In a possible implementation, the first sending unit 122 is further configured to send resource occupation information of the first apparatus to the second apparatus, where the resource occupation information is used to indicate a third time-frequency resource.

In a possible implementation, the first receiving unit 120 is further configured to receive acknowledgement information for the resource occupation information from the second apparatus, where the third time-frequency resource includes the second time-frequency resource.

In a possible implementation, the first receiving unit 120 is further configured to receive resource reallocation information from the second apparatus, where the resource reallocation information is used to indicate a fourth time-frequency resource; and the first sending unit 122 is further configured to send third information to at least one third apparatus based on the resource reallocation information by using a fifth time-frequency resource, where the fifth time-frequency resource is a subset of the fourth time-frequency resource.

In a possible implementation, the first time-frequency resource is discontinuous in time domain.

In a possible implementation, the fourth time-frequency resource is discontinuous in time domain.

It should be noted that for implementation of the units, reference should be made to corresponding description of the steps performed by the first apparatus in the method embodiments shown in FIG. 4 to FIG. 11. Details are not described herein again.

Figure 13:
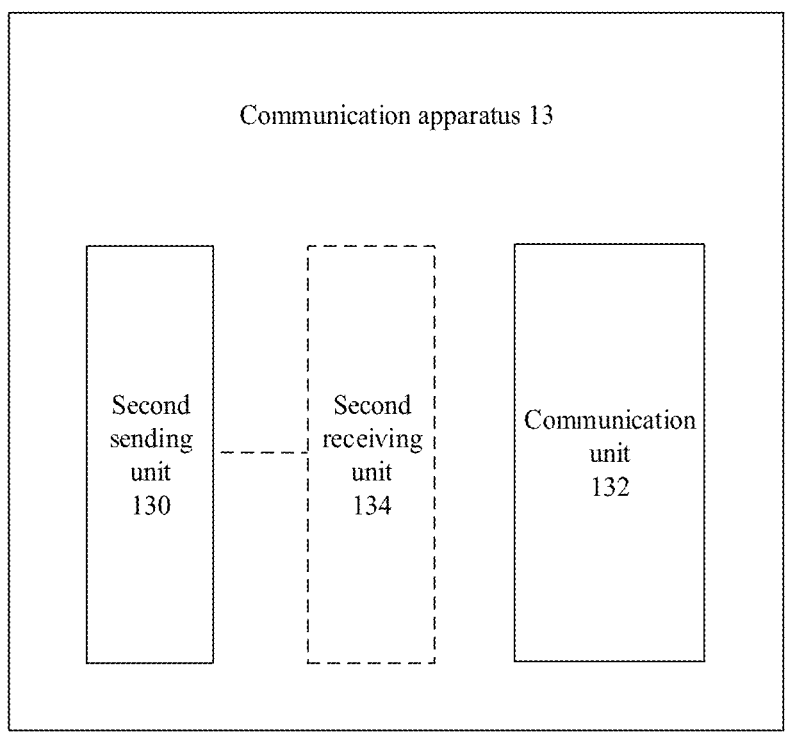
FIG. 13 is a schematic diagram of a structure of another communication apparatus according to an embodiment of the present application.

Refer to FIG. 13. FIG. 13 is a schematic diagram of a structure of still another communication apparatus according to an embodiment of the present application. A communication apparatus 13 may include a second sending unit 130 and a communication unit 132. Detailed description of the units is as follows.

The second sending unit 130 is configured to send first information, where the first information is used to indicate a first time-frequency resource.

The communication unit 132 is configured to communicate with at least one fourth apparatus by using a target time-frequency resource, where the target time-frequency resource and the first time-frequency resource are non-overlapping.

The first time-frequency resource includes a second time-frequency resource, the second time-frequency resource is used to carry second information transmitted between a first apparatus and at least one third apparatus, and the second information includes a first synchronization signal and at least one of service data, control information, or system information.

In a possible implementation, the first information is carried in at least one of a second synchronization signal, a broadcast message, a unicast message, or a multicast message.

In a possible implementation, the communication apparatus may further include:
- a second receiving unit 134 configured to receive resource request information; and
- the second sending unit 130 is further configured to send resource reallocation information based on the resource request information, where the resource reallocation information is used to indicate a fourth time-frequency resource.

In a possible implementation, the second receiving unit 134 is further configured to receive resource occupation information, where the resource occupation information is used to indicate a third time-frequency resource; and
- the second sending unit 130 is further configured to send resource reallocation information based on the resource occupation information, where the resource reallocation information is used to indicate a fourth time-frequency resource.

In a possible implementation, the resource request information includes:
- at least one of a communication service volume of the first apparatus, a resource requirement of the first apparatus, or channel quality of the first apparatus.

In a possible implementation, the second receiving unit 134 is further configured to receive the resource occupation information, where the resource occupation information is used to indicate the third time-frequency resource; and
- the second sending unit 130 is further configured to send acknowledgement information for the resource occupation information, where the third time-frequency resource includes the second time-frequency resource.

In a possible implementation, the first time-frequency resource is discontinuous in time domain.

In a possible implementation, the fourth time-frequency resource may also be discontinuous in time domain.

It should be noted that for implementation of the units, reference should be made to corresponding description of the steps performed by the second apparatus in the method embodiments shown in FIG. 4 to FIG. 11. Details are not described herein again.

Figure 14:
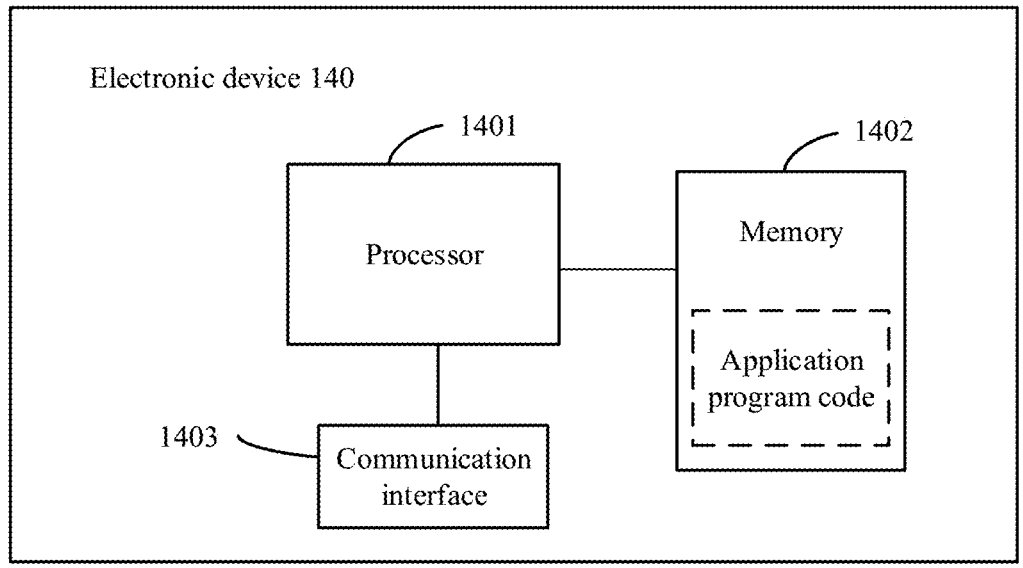
FIG. 14 is a schematic diagram of a structure of an electronic device according to an embodiment of this application.

FIG. 14 is a schematic diagram of a structure of an electronic device according to an embodiment of this application. An electronic device 140 includes at least one processor 1401 and at least one communication interface 1403. Optionally, the electronic device 140 may further include at least one memory 1402. In addition, the device may further include general components such as an antenna. Details are not described herein.

The processor 1401 may be a general-purpose central processing unit (CPU), a microprocessor, an application-specific integrated circuit (ASIC), or one or more integrated circuits configured to control program execution in the foregoing solutions.

The electronic device includes the communication interface 1403, and the communication interface is used for communication with another device or a communication network, for example, the Ethernet, a radio access network (RAN), a core network, or a wireless local area network (WLAN).

If the electronic device 140 includes the memory 1402, the memory may be a read-only memory (ROM) or another type of static storage device capable of storing static information and instructions, or a random access memory (RAM) or another type of dynamic storage device capable of storing information and instructions; or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, and the like), a magnetic disk storage medium or another magnetic storage device, or any other medium that can carry or store expected program code having an instruction or data structure form and can be accessed by a computer; but the memory is not limited thereto. The memory may exist independently, and is connected to the processor through a bus. Alternatively, the memory may be integrated with the processor.

The memory 1402 is configured to store application program code for executing the foregoing solutions, and the processor 1401 controls the execution. The processor 1401 is configured to execute the application program code stored in the memory 1402.

The code stored in the memory 1402 may be used to perform the steps performed by the first apparatus or the second apparatus in the communication methods provided in FIG. 4 to FIG. 11.

Optionally, the electronic device 140 may be the first apparatus or the second apparatus in the communication method provided in FIG. 4 to FIG. 11.

Optionally, the electronic device 140 may alternatively be a chip or an integrated circuit.

Optionally, the electronic device 140 may alternatively be integrated into an in-vehicle central controller or an MDC controller.

It should be noted that for functions of the functional units in the electronic device 140 described in this embodiment of this application, reference may be made to the related description of the foregoing method embodiments in FIG. 4 to FIG. 11. Details are not described herein again.

An embodiment of this application further provides a vehicle, where the vehicle includes the foregoing second apparatus. Further optionally, the vehicle includes the at least one fourth apparatus.

An embodiment of this application further provides a communication system. The communication system includes one or more of the first apparatus, the second apparatus, the at least one third apparatus, or the at least one fourth apparatus.

Figure 15:
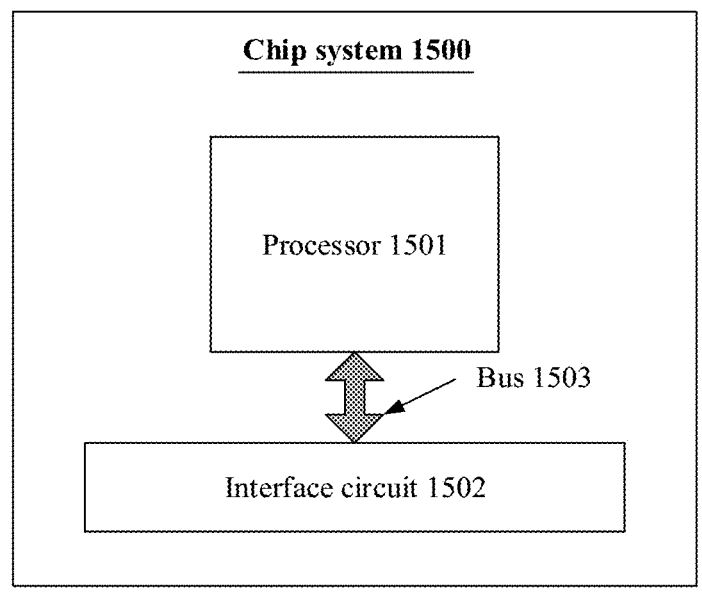
FIG. 15 is a schematic diagram of a structure of a chip according to an embodiment of this application.

Refer to FIG. 15. An embodiment of this application further provides a chip 1500, including one or more processors 1501 and an interface circuit 1502. Optionally, the chip 1500 may further include a bus 1503.

The processor 1501 may be an integrated circuit chip and can process a signal. In an implementation process, the steps in the foregoing methods can be performed by using a hardware integrated logic circuit in the processor 1501, or by using instructions in a form of software. The processor 1501 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor 1501 may implement or perform the methods and steps that are disclosed in embodiments of this application. The general-purpose processor may be a microprocessor, or the processor may be any conventional processor or the like.

The interface circuit 1502 may send or receive data, instructions, or information. The processor 1501 may process data, instructions, or other information received through the interface circuit 1502, and send, through the interface circuit 1502, information obtained through processing.

Optionally, the chip further includes a memory. The memory may include a read-only memory and a random access memory, and provide operation instructions and data for the processor. A part of the memory may further include a non-volatile random access memory (NVRAM).

Optionally, the memory stores an executable software module or a data structure, and the processor may perform a corresponding operation by invoking operation instructions (the operation instructions may be stored in an operating system) stored in the memory.

Optionally, the chip may be used in the electronic device or the network device in embodiments of this application. Optionally, the interface circuit 1502 may be configured to output an execution result of the processor 1501. For the communication method provided in one or more embodiments of this application, refer to the foregoing embodiments. Details are not described herein again.

It should be noted that functions corresponding to the processor 1501 and the interface circuit 1502 may be implemented through hardware design, software design, or a combination of software and hardware. This is not limited herein.

The foregoing mainly describes solutions provided in embodiments of this application from a perspective of the method implemented by the electronic device. It may be understood that to implement the foregoing functions, each network element, such as the electronic device or the processor, includes a corresponding hardware structure and/or software module for performing each function. A person skilled in the art should easily be aware that the network elements and algorithm steps of examples described with reference to embodiments disclosed in this specification can be implemented in a form of hardware or in a form of a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional module division may be performed on the electronic device, the communication device, and the like based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

An embodiment of this application further provides a computer-readable storage medium. All or some of the procedures in the foregoing method embodiments may be completed by a computer program instructing related hardware. The program may be stored in the foregoing computer storage medium. When the program is executed, the procedures of the foregoing method embodiments may be included. The computer-readable storage medium includes any medium that can store program code, such as a read-only memory (ROM), a random access memory (RAM), a magnetic disk, or an optical disc.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state disk (SSD)), or the like.

A sequence of the steps of the methods in embodiments of this application may be adjusted, combined, and deleted based on an actual requirement.

The modules in the apparatus in embodiment of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, a person of ordinary skill in the art should understand that modifications may still be made to the technical solutions described in the foregoing embodiments or equivalent replacements may be made to some technical features thereof, without departing from the scope of the technical solutions of embodiments of this application.

What is claimed is:

1. A communication method, comprising:
  receiving, by a first apparatus, first information from a second apparatus, wherein the first information is used to indicate a first time-frequency resource; and
  sending, by a first apparatus, second information to at least one third apparatus based on the first information by using a second time-frequency resource, wherein the second information comprises a first synchronization signal and at least one of service data, control information, or system information, and the second time-frequency resource is a subset of the first time-frequency resource, wherein the first apparatus receives service data from the at least one third apparatus by using the second time-frequency resource.

2. The method according to claim 1, wherein the first information is carried in at least one of a second synchronization signal, a broadcast message, a unicast message, or a multicast message.

3. The method according to claim 1, wherein the method further comprises:
sending resource change information to the at least one third apparatus, wherein the resource change information is used to indicate information about the second time-frequency resource.

4. The method according to claim 1, wherein the method further comprises:
sending resource request information to the second apparatus.

5. The method according to claim 4, wherein the resource request information comprises:
at least one of a communication service volume of a first apparatus, a resource requirement of the first apparatus, or channel quality of the first apparatus.

6. The method according to claim 1, further comprising:
sending resource occupation information of the first apparatus to the second apparatus, wherein the resource occupation information is used to indicate a third time-frequency resource.

7. The method according to claim 1, wherein the first time-frequency resource is discontinuous in time domain.

8. A communication method, comprising:
sending first information, wherein the first information is used to indicate a first time-frequency resource; and
communicating with at least one fourth apparatus by using a target time-frequency resource, wherein the target time-frequency resource and the first time-frequency resource are non-overlapping, wherein
the first time-frequency resource comprises a second time-frequency resource, the second time-frequency resource is used to carry second information transmitted between a first apparatus and at least one third apparatus, and the second information comprises a first synchronization signal and at least one of service data, control information, or system information, wherein the first apparatus receives service data from the at least one third apparatus by using the second time-frequency resource.

9. The method according to claim 8, wherein the first information is carried in at least one of a second synchronization signal, a broadcast message, a unicast message, or a multicast message.

10. The method according to claim 8, wherein the method further comprises:
receiving resource request information; and
sending resource reallocation information based on the resource request information, wherein the resource reallocation information is used to indicate a fourth time-frequency resource.

11. The method according to claim 10, wherein the resource request information comprises:
at least one of a communication service volume of the first apparatus, a resource requirement of the first apparatus, or channel quality of the first apparatus.

12. The method according to claim 8, wherein the method further comprises:

receiving resource occupation information, wherein the resource occupation information is used to indicate a third time-frequency resource; and
sending the resource reallocation information based on the resource occupation information, wherein the resource reallocation information is used to indicate the fourth time-frequency resource.

13. The method according to claim 8, wherein the method further comprises:
receiving the resource occupation information, wherein the resource occupation information is used to indicate the third time-frequency resource; and
sending acknowledgement information for the resource occupation information, wherein the third time-frequency resource comprises the second time-frequency resource.

14. The method according to claim 8, wherein the first time-frequency resource is discontinuous in the time domain.

15. A communication apparatus, wherein the communication apparatus comprises:
a processor;
a first receiver, configured to in coordination with the processor, receive first information from a second apparatus, wherein the first information is used to indicate a first time-frequency resource; and
a first transmitter, configured to, in coordination with the processor, send second information to at least one third apparatus based on the first information by using a second time-frequency resource, wherein the second information comprises a first synchronization signal and at least one of service data, control information, or system information, and the second time-frequency resource is a subset of the first time-frequency resource, wherein the communication apparatus receives service data from the at least one third apparatus by using the second time-frequency resource.

16. The apparatus according to claim 15, wherein the first information is carried in at least one of a second synchronization signal, a broadcast message, a unicast message, or a multicast message.

17. The apparatus according to claim 15, wherein the first transmitter is further configured to, in coordination with the processor, send resource change information to the at least one third apparatus, wherein the resource change information is used to indicate information about the second time-frequency resource.

18. The apparatus according to claim 15, wherein the first transmitter is further configured to, in coordination with the processor, send resource request information to the second apparatus.

19. The apparatus according to claim 18, wherein the resource request information comprises:
at least one of a communication service volume of a first apparatus, a resource requirement of the first apparatus, or channel quality of the first apparatus.

20. The apparatus according to claim 15, wherein the first transmitter is further configured to, in coordination with the processor, send resource occupation information of the first apparatus to the second apparatus, and the resource occupation information is used to indicate a third time-frequency resource.

21. The apparatus according to claim 20, wherein the first receiver is further configured to, in coordination with the processor, receive acknowledgement information for the resource occupation information from the second apparatus, wherein the third time-frequency resource comprises the second time-frequency resource.

22. The apparatus according to claim 18, wherein the first receiver is further configured to, in coordination with the processor, receive resource reallocation information from the second apparatus, and the resource reallocation information is used to indicate a fourth time-frequency resource; and the first transmitter is further configured to, in coordination with the processor, send third information to at least one third apparatus based on the resource reallocation information by using a fifth time-frequency resource, wherein the fifth time-frequency resource is a subset of the fourth time-frequency resource.

23. The apparatus according to claim 15, wherein the first time-frequency resource is discontinuous in time domain.

24. A communication apparatus, wherein the communication apparatus comprises:

a processor; and a second transmitter, configured to, in coordination with the processor, send first information, wherein the first information is used to indicate a first time-frequency resource, and wherein the processor is configured to communicate with at least one fourth apparatus by using a target time-frequency resource, wherein the target time-frequency resource and the first time-frequency resource are non-overlapping, wherein the first time-frequency resource comprises a second time-frequency resource, the second time-frequency resource is used to carry second information transmitted between a first apparatus and at least one third apparatus, and the second information comprises a first synchronization signal and at least one of service data, control information, or system information, wherein the first apparatus receives service data from the at least one third apparatus by using the second time-frequency resource.

25. The apparatus according to claim 24, wherein the first information is carried in at least one of a second synchronization signal, a broadcast message, a unicast message, or a multicast message.

26. The apparatus according to claim 24, wherein the communication apparatus further comprises:

a second receiver, configured to, in coordination with the processor, receive resource request information; and the second transmitter is further configured to, in coordination with the processor, send resource reallocation information based on the resource request information, wherein the resource reallocation information is used to indicate a fourth time-frequency resource.

27. The apparatus according to claim 26, wherein the resource request information comprises:

at least one of a communication service volume of the first apparatus, a resource requirement of the first apparatus, or channel quality of the first apparatus.

28. The apparatus according to claim 24, wherein the second receiver is further configured to, in coordination with the processor, receive resource occupation information, and the resource occupation information is used to indicate a third time-frequency resource; and the second transmitter is further configured to send the resource reallocation information based on the resource occupation information, wherein the resource reallocation information is used to indicate the fourth time-frequency resource.

29. The apparatus according to claim 24, wherein the second receiver is further configured to, in coordination with the processor, receive the resource occupation information, and the resource occupation information is used to indicate the third time-frequency resource; and the second transmitter is further configured to, in coordination with the processor, send acknowledgement information for the resource occupation information, wherein the third time-frequency resource comprises the second time-frequency resource.

30. The apparatus according to claim 24, wherein the first time-frequency resource is discontinuous in time domain.

* * * * *